(12) United States Patent
Isaacs et al.

(10) Patent No.: US 11,341,705 B1
(45) Date of Patent: May 24, 2022

(54) ANIMATED TRANSITIONS IN DATA VISUALIZATIONS ACCORDING TO CHARACTERISTICS OF THE DATA VISUALIZATIONS

(71) Applicant: Tableau Software, Inc., Seattle, WA (US)

(72) Inventors: Paul Matthew Isaacs, San Francisco, CA (US); Kyle Johns, Redmond, WA (US); Jock Douglas Mackinlay, Bellevue, WA (US)

(73) Assignee: TABLEAU SOFTWARE, INC., Seattle, WA (US)

( * ) Notice: Subject to any disclaimer, the term of this patent is extended or adjusted under 35 U.S.C. 154(b) by 0 days.

(21) Appl. No.: 16/164,725

(22) Filed: Oct. 18, 2018

(51) Int. Cl.
  *G06F 16/904* (2019.01)
  *G06T 11/20* (2006.01)
  *G06T 13/80* (2011.01)
  *G06F 3/04842* (2022.01)

(52) U.S. Cl.
  CPC .......... *G06T 13/80* (2013.01); *G06F 3/04842* (2013.01); *G06F 16/904* (2019.01); *G06T 11/206* (2013.01)

(58) Field of Classification Search
  None
  See application file for complete search history.

(56) References Cited

U.S. PATENT DOCUMENTS 10,521,077 B1 * 12/2019 Beran ................. G06F 3/04842
2011/0078560 A1   3/2011 Weeldreyer et al.
2014/0282276 A1 *  9/2014 Drucker .............. G06F 3/04883
                                                  715/863
2015/0113460 A1 *  4/2015 High ..................... G06F 9/451
                                                  715/771
2016/0349972 A1 * 12/2016 Miyoshi .............. G06F 3/04845

OTHER PUBLICATIONS

Isaacs, Preinterview First Office Action, U.S. Appl. No. 16/164,697, dated Dec. 2, 2019, 5 pgs.
Isaacs, First Action Interview Office Action, U.S. Appl. No. 16/164,697, dated May 7, 2020, 6 pgs.
Isaacs, Final Office Action, U.S. Appl. No. 16/164,697, dated Sep. 23, 2020, 13 pgs.
Isaacs, Office Action, U.S. Appl. No. 16/164,697, dated Apr. 19, 2021, 11 pgs.

* cited by examiner

*Primary Examiner* — Kyle Zhai
(74) *Attorney, Agent, or Firm* — Morgan, Lewis & Bockius LLP

(57) ABSTRACT

A method is performed at a computing device coupled with a display. The method includes displaying a graphical user interface that includes a data visualization in a first state, including a plurality of visual marks. Each of the plurality of visual marks is displayed in a corresponding first position. The method includes receiving user input in the graphical user interface to specify an action that triggers an animated transition of the data visualization from the first state to a second state. The data visualization in the second state includes one or more of the plurality of visual marks in corresponding second positions. The method includes, in response to the user input, triggering the animated transition of the data visualization from the first to the second state. The animated transition is configured by three or more visual parameters, including: an animation mode, an animation speed, and an animation emphasis.

20 Claims, 44 Drawing Sheets

610 In response to the user input, trigger the animated transition of the data visualization from the first state to the second state. The animated transition is configured by three or more visual parameters, including: an animation mode, an animation speed, and an animation emphasis.

> 612 The animation mode is one of:
> a synchronized mode in which movements of one or more visual marks of the plurality of visual marks are displayed at the same pace;
> a phased mode in which: movements of a first group of visual marks of the plurality of visual marks are displayed in a first stage of a plurality of stages, movements of a second group of visual marks of the plurality of visual marks are displayed in a second stage of the plurality of stages, and the first group of visual marks is different from the second group of visual marks; and
> a cut mode in which the animated transition switches from the first state to the second state by directly displaying the one or more visual marks of the plurality of visual marks in the corresponding second position without displaying a movement trajectory of a visual mark of the one or more visual marks from the corresponding first position to the corresponding second position.

> 614 When the animated transition is configured in the synchronized mode or the phased mode, the animated transition includes:
> moving at least one visual mark of the one or more visual marks, including displaying on the display a trajectory of the at least one visual mark from the corresponding first position to the corresponding second position.

> 616 When the animated transition is configured in the synchronized mode or the phased mode, the device:
> receives user input in the graphical user interface to specify an action that triggers a replaying of the animated transition, and in response to the user input, replays the animated transition and modifies the animated transition according to the animation emphasis.

> 618 The animation emphasis highlights a designated region within the data visualization.

> 620 The animation speed specifies the duration of the animated transition.

Figure 6B

ANIMATED TRANSITIONS IN DATA VISUALIZATIONS ACCORDING TO CHARACTERISTICS OF THE DATA VISUALIZATIONS

CROSS REFERENCE TO RELATED APPLICATION

This application is related to U.S. patent application Ser. No. 16/164,697, filed Oct. 18, 2018, entitled "Animated Transitions in Line Chart Data Visualizations", which is incorporated herein by reference in its entirety.

TECHNICAL FIELD

The disclosed implementations relate generally to data visualization and more specifically to systems, methods, and user interfaces that enable users to observe animated transitions between data visualizations.

BACKGROUND

Data visualization applications enable a user to understand a data set visually, including distribution, trends, outliers, and other factors that are important to making business decisions. Some data sets are very large or complex, and include many data fields. Various tools can be used to help a user generate data visualizations for various data sets, but typically require a user to learn a complex user interface.

SUMMARY

When a user changes a data visualization from a first state to a second state, a transition is displayed between the first state and the second state. The transition can involve adding, removing, or moving data marks. In addition to being visually pleasing to view animated transitions between data visualizations, animations can also assist users to see what is happening and more easily understand the links between the data and the data visualizations.

Accordingly, the present disclosure provides more efficient methods and interfaces for animating transitions between data visualizations. Such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

Depending on the type of data visualization, animation parameters, such as mode, speed, and emphasis, are set to a default value. Further, depending on the user's interaction with the data, the default settings can change. For example, when a user is simply analyzing data, the default is that the duration of the animation should not take longer than 0.5 seconds, and the mode is set to synchronized mode because consistency in the animation is preferred. The duration of the animation should not be long because it could slow down the data analysis process to an extent that data analysts want to turn it off. However, when the user needs to further analyze the data, the user can trigger (e.g., via a user input in the graphical user interface) a replay of the animation. The speed of the animation of the replay can vary (e.g., instant replay, normal speed replay, slow replay, or very slow replay). Further, the user can replay and navigate the animation via a scrub bar (e.g., a slider) that allows the user to move forwards or backwards in the animation. In some implementations, the animation can be replayed in a "rocker" style, like a rocking chair moving rhythmically forwards and backwards.

In accordance with some implementations, a method executes at a computing device coupled with a display. For example, the computing device can be a smart phone, a tablet, a notebook computer, or a desktop computer. The method includes displaying a graphical user interface on the display. The graphical user interface includes a data visualization region that includes a data visualization in a first state that includes a plurality of visual marks. Each of the plurality of the visual marks is displayed in a corresponding first position.

The method includes receiving a user input in the graphical user interface to specify an action that triggers an animated transition of the data visualization from the first state to a second state. The data visualization in the second state includes one or more of the plurality of visual marks in corresponding second positions.

The method includes, in response to the user input, triggering the animated transition of the data visualization from the first state to the second state. The animated transition is configured by three or more visual parameters, including: an animation mode, an animation speed, and an animation emphasis.

In some implementations, the first state displays a first type of chart and the second state displays a second type of chart. In some implementations, the animated transition includes moving at least one user interface element.

In some implementations, the animation mode is one of: a synchronized mode, a phased mode, or a cut mode. In the synchronized mode, movements of one or more visual marks of the plurality of visual marks are displayed at the same pace and occur concurrently. In the phased mode, movements of a first group of visual marks of the plurality of visual marks are displayed in a first stage of a plurality of stages, movements of a second group of visual marks of the plurality of visual marks are displayed in a second stage of the plurality of stages, and the first group of visual marks is different from the second group of visual marks. The first stage is temporally before the second stage. In the cut mode, the animated transition switches from the first state to the second state by directly displaying the one or more visual marks of the plurality of visual marks in the corresponding second position without displaying a movement trajectory of a visual mark of the one or more visual marks from the corresponding first position to the corresponding second position.

A staged animation can have more than two stages. For example, some implementations define four or more object groups, each of which can be staged independently of the other object groups. Within an object group, all of the objects are animated together. For example, some implementations define a first group of objects for data marks that will exit during the animation, a second object group for data marks that will enter during the animation, a third group of data marks that remain in the data visualization, but move, and a fourth group of objects that are not data marks (e.g., data visualization axes and labels). In some implementations, there are some groups that can have two or more animation steps. For example, data marks that are neither entering nor exiting can be included in a moving stage where the movement accommodates other data marks that are either removed or added, and a sort stage where the marks are resorted.

In some implementations, when the animated transition is configured in the synchronized mode or the phased mode, the animated transition includes moving at least one visual mark of the one or more visual marks, including displaying on the display a trajectory of the at least one visual mark from the corresponding first position to the corresponding second position.

In some implementations, when the animated transition is configured in the synchronized mode or the phased mode, the method includes receiving user input in the graphical user interface to specify an action that triggers replaying the animated transition. In response to the user input, the method replays the animated transition and modifies the animated transition according to the animation emphasis.

In some implementations, the animation emphasis highlights a specific region within the data visualization (e.g., highlighting a small region that identifies key changes to the data visualization).

In some implementations, the animation speed specifies the duration of the animated transition.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily build and update data visualizations that include animated transitions between the data visualizations.

BRIEF DESCRIPTION OF THE DRAWINGS

For a better understanding of the disclosed systems, methods, and graphical user interfaces, as well as additional systems, methods, and graphical user interfaces that provide animated transitions between data visualizations, reference should be made to the Description of Implementations below, in conjunction with the following drawings, in which like reference numerals refer to corresponding parts throughout the figures.

FIGS. 6A and 6B provide a flowchart of a process for displaying a data visualization according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods and devices described in the present specification improve upon data visualization methods by automatically creating default animated transitions between data visualizations. Such methods and devices reduce the burden on the user by displaying changes to the data visualization in a cohesive way. When a user changes the data input for a data visualization, creating a slow transition that showcases how the change to the data has affected the data visualization allows a user to more easily analyze the data based on the data visualizations. Methods and devices described herein automatically create default animated transitions to provide the user with a more positive experience when using a data visualization application.

Figure 1:
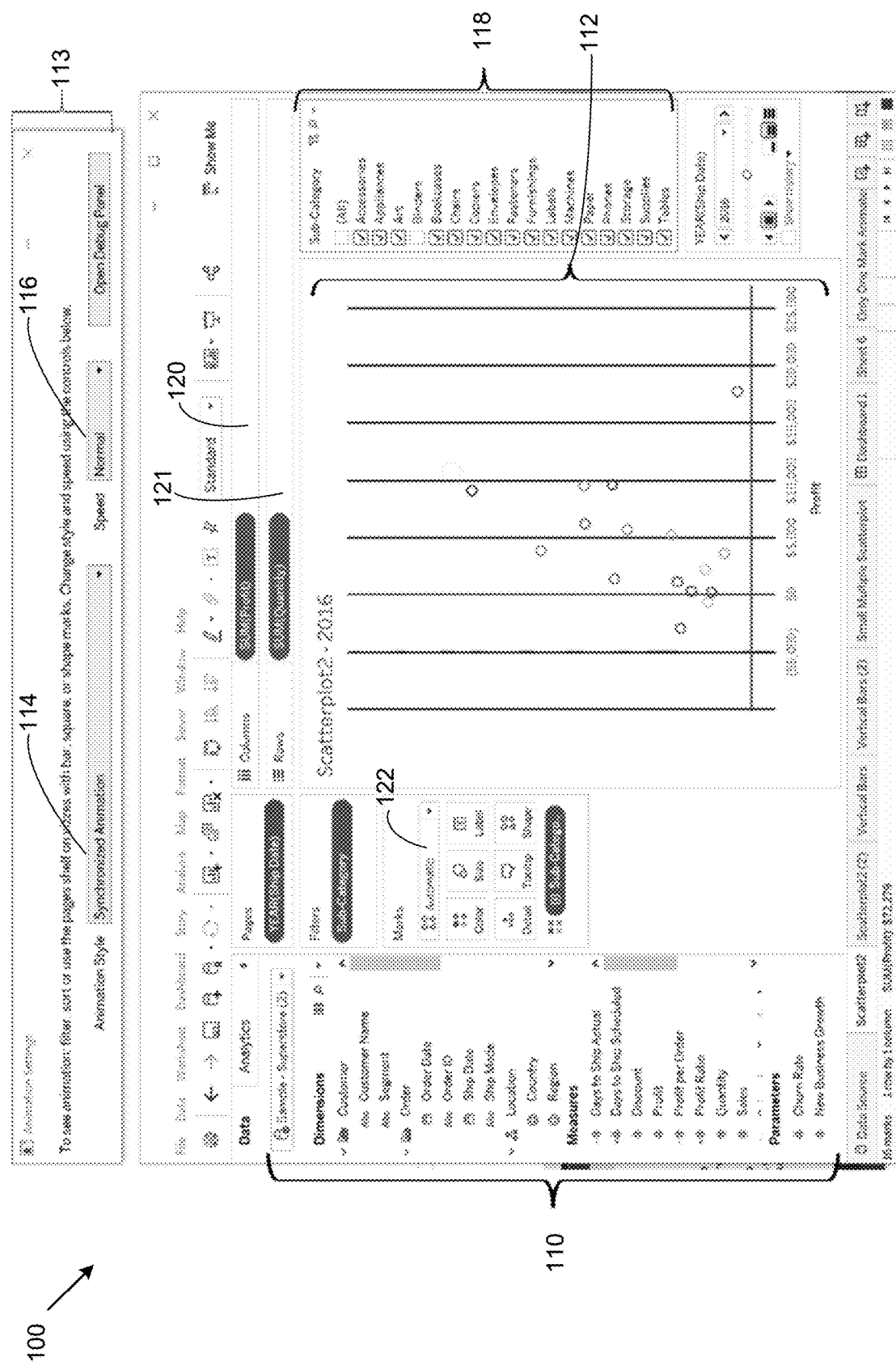
FIG. 1 is a graphical user interface according to some implementations.

FIG. 1 shows a graphical user interface 100 for interactive data analysis. The user interface 100 displays a schema information region 110, which is also referred to as a data pane. The schema information region 110 provides data fields that may be selected and used to build a data visualization. In some implementations, the data fields of a schema are separated into a group of dimensions (e.g., categorical data) and a group of measures (e.g., numeric quantities) in the schema information region 110. The user interface 100 displays an animation settings interface 113 (e.g., a popup window), which includes an animation style dropdown 114 and a speed dropdown 116. The animation style dropdown 114 includes selectable options for different animation styles (e.g., modes). For example, a first mode (e.g., a "cut" mode) is an animation that cuts directly from the first state to the second state (i.e., there really is no animation). In a second mode (e.g., a "flow" mode or "synchronized" mode), all of the changes move at the same time and the same pace. That is, the animation may show adding marks, removing marks, sorting marks according to some criteria, and moving, sizing, or coloring marks according to some criteria, all at the same time. In a third mode (e.g., a "phased" mode), the animation proceeds in two or more temporal phases or stages (e.g., exit, move, sort, enter). For example, the animation may be configured to first show marks being removed, then move, resize and/or recoloring the remaining marks, then sort the remaining marks, and finally add new marks. The staging/phasing can be performed at various levels of granularity (e.g., a stage may animate a single mark, a large group or marks, or any size in between) and staged according to different criteria.

The speed dropdown 116 includes selectable options to specify how long an animation will take. The speed can depend on the user input that modifies the data visualization. For example, some changes should be quick because the user is familiar with what is happening. On the other hand, in an exploratory frame of mind, a medium speed may be useful to help the user learn something about the data. It is also useful to have a slow speed for giving presentations.

The user interface 100 also displays a filter region 118, which allows a user to select (e.g., or deselect) certain data to be included (e.g., or excluded) from the data visualization. In some implementations, the graphical user interface 100 includes a data visualization region 112 for displaying the generated data visualization. The data visualization may be generated based on the data fields placed on the columns shelf 120 and the rows shelf 121, as well as the filter applied based on the selected categories in the filter region 118.

Figure 4A:
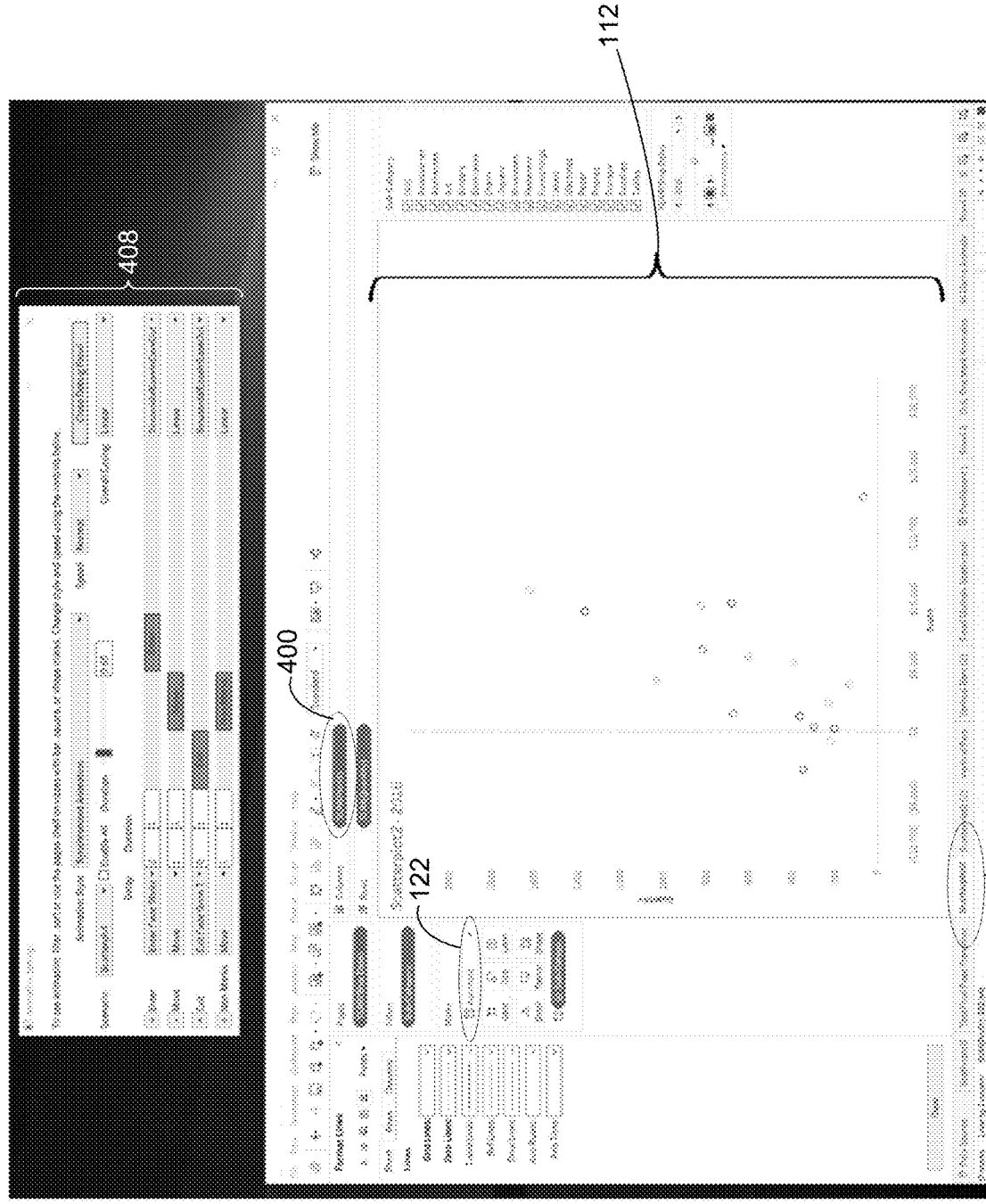
FIGS. 4A-4M provide a series of screen shots for animated transitions for different view types of data visualizations according to some implementations.

In some implementations, the type of data visualization may be changed by using a mark type selector 122. In some implementations, a user can select (e.g., from a dropdown as shown in FIG. 4G) a mark type for the data visualization instead of the automatically generated mark type. For example, the mark type for the data visualization selected in FIG. 1 is "Automatic" and the computing system has defaulted to using circle marks for the displayed scatterplot. Additional mark types are available, such as "bar," "map," "line," "pie," and "text." In some implementations, the data visualization is generated according to a default mark type (e.g., "Automatic") based on the input (e.g., the data fields on the columns shelf 120 and the rows shelf 121). In some implementations, the default mark type is selected according to the view type (also known as chart type). In some implementations, the view type is based on a top-ranked visualization type as determined according to data types of the user-selected data fields and/or data values for the user-selected data fields, as described in U.S. Pat. Nos. 8,099,674 and 9,424,318, each of which is incorporated by reference in its entirety. For example, when the input is modified, a different type of data visualization is displayed.

In some implementations, only mark types that make sense for the current data field selections are provided as options to the user.

In some implementations, a data field may be designated as a dimension or as a measure in the database itself (e.g., if the data source is a cube data source). In other implementations, a data visualization application 222 automatically assigns a default role to each data field, which is either a measure or a dimension based on the data type of the data field. For example, numeric fields by default are used as measures, whereas non-numeric fields (e.g., text fields and date fields) by default are used as dimensions. A user can override the assigned default role when appropriate. For example, a numeric "ID" field may be initially classified as a measure, but a user may reclassify the "ID" field as a dimension.

A dimension is a data field that organizes data into categories (also referred to as "buckets"). For example, if a data source includes data associated with the "United States" and the data source includes a data field corresponding to "State," the "State" is used as a dimension. Each dimension creates distinct divisions within a data visualization, such as separate bars in a bar chart (e.g., a separate bar for each state). These divisions are typically labeled with dimension headers, with one header for each corresponding dimension value (e.g., each bar may be labeled with the name of the corresponding state).

A measure is a data field that is used to measure something, such as sales amount, profit, or order quantity, and is typically continuous. For example, whereas the dimension 'State' has a fixed set of discrete possible values, a 'Sales Amount' data field can have any value within a large range. A significant number of records could include a variety of small sales amounts correlating to lower-priced items and many other records may include larger amounts of sales for higher-priced items. Each measure is typically aggregated to a single value (e.g., by default measures are summed) at a level of detail (grouping) according to the selected dimensions (e.g., sales may be aggregated by state).

Figure 2:
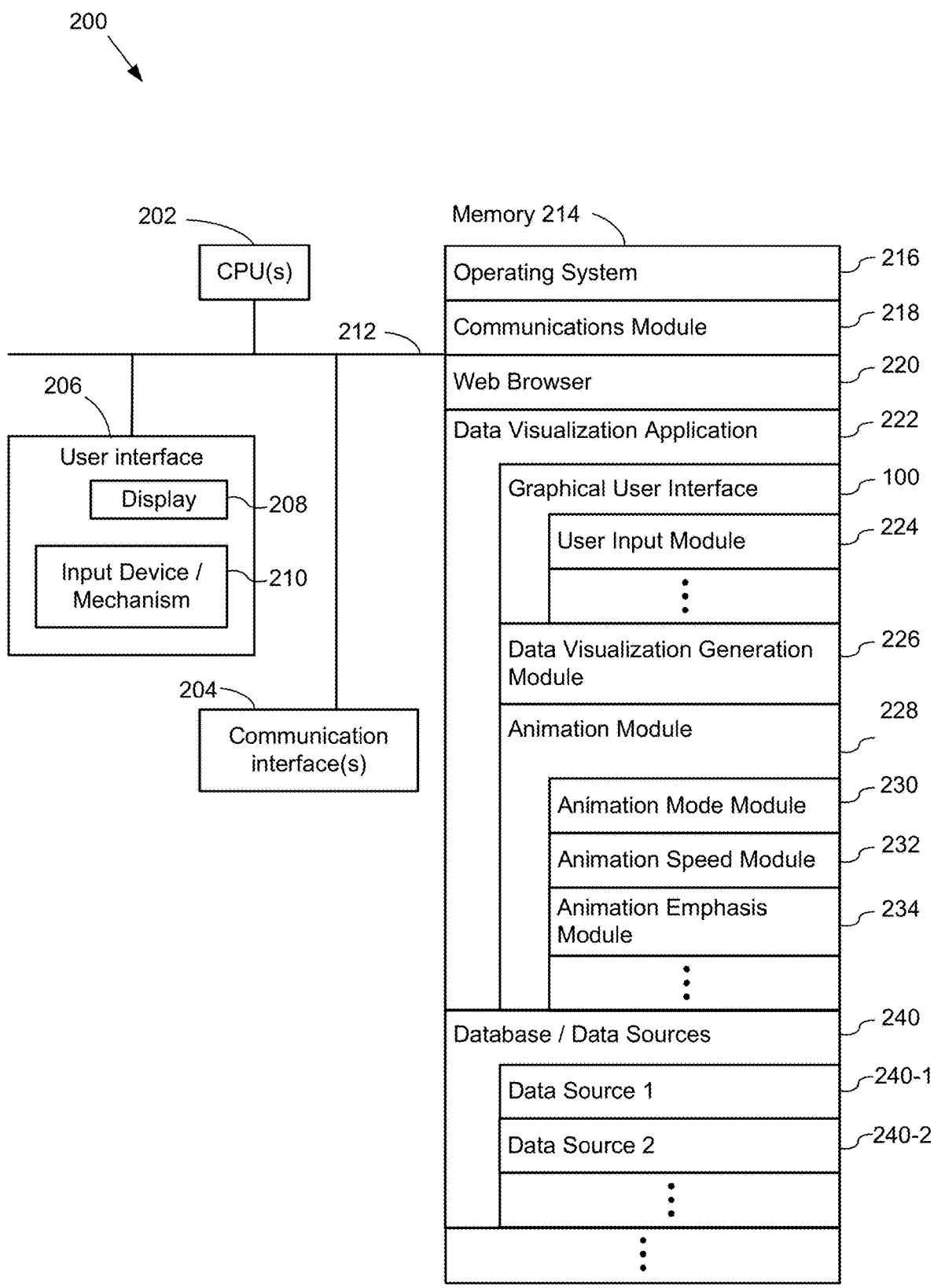
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 222. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory device(s) within the memory 214, comprises a non-transitory computer-readable storage medium. In some implementations, the memory 214, or the computer-readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222. In some implementations, the data visualization application 222 includes:
  - a graphical user interface 100 for a user to construct visual graphics. For example, a user inputs parameters (e.g., via the shelves 120 and 121), identifying one or more data sources 240 (which may be stored on the computing device 200 or stored remotely) and/or data fields from the data source(s). The selected fields are used to define a visual graphic.

The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server;

a data visualization generation module 226, which takes the user input, and generates a corresponding visual graphic (also referred to as a "data visualization" or a "data viz");

an animation module 228, which receives user input and generates animations to display during transitions between data visualizations. In some implementations, the animation module 228 includes an animation mode module 230, which determines which animation mode to use in the animation, an animation speed module 232, which determines the rate at which the animation will run, and an animation emphasis module 234, which determines which, if any, portions of the animation will be emphasized. For example, an animation can use various techniques to emphasize certain aspects. For example, a key region of the viz (or specific marks) can be highlighted during the animation, or color could be used to show different portions that are correlated (e.g., correlating marks from two or more vizzes on a dashboard). Typically, emphasis is used only when asked to repeat an animation (e.g., "show me what just happened"). In some implementations, a user can specify the use of emphasis and/or the type of emphasis using a natural language command;

zero or more databases or data sources 240 (e.g., a first data source 240-1 and a second data source 240-2), which are used by the data visualization application 222. In some implementations, the data sources are stored as spreadsheet files, CSV files, XML files, flat files, or JSON files, or stored in a relational database.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

FIGS. 3A-3K, 4A-4M, and 5A-5N illustrate how animation parameters affect specific animations. The animation parameters are generally not visible to most users, because the animation parameters have been predetermined according to characteristics of the data visualization a user is viewing. However, to illustrate the correlation between animation parameters and the behavior, the animation parameters are displayed in a debug window 408, which allows a developer, IT staff, or an application administrator to change the animation parameters appropriately. A more complete description of the debug window and the animation parameters is provided below in FIGS. 7A and 7B. Because of the very large number of possible combinations of animation parameter values, only a subset of these features are illustrated in FIGS. 3A-3K, 4A-4M, and 5A-5N.

Figure 3A:
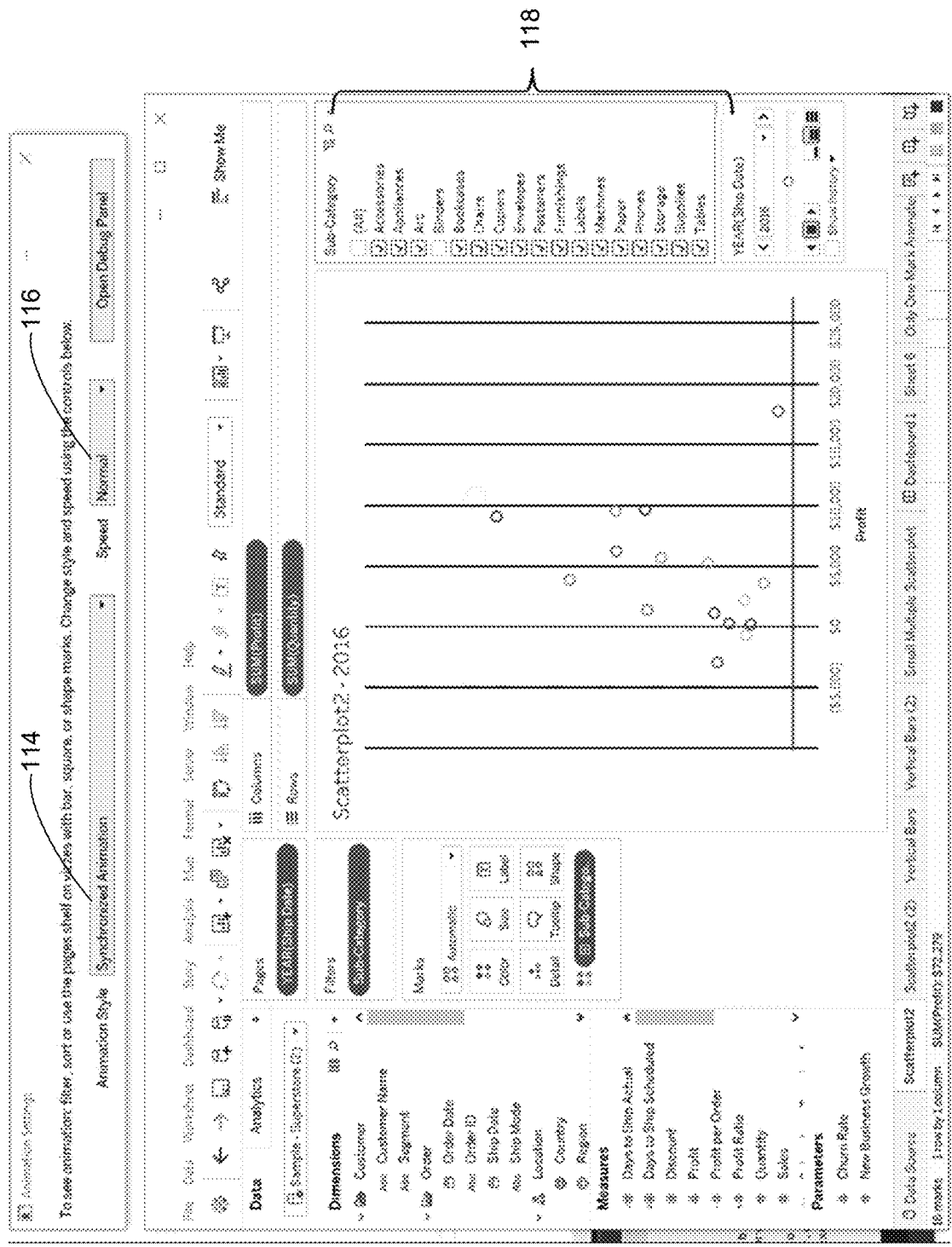
FIGS. 3A-3K provide a series of screen shots for an animated transition of a data visualization according to some implementations.
Figure 3B:
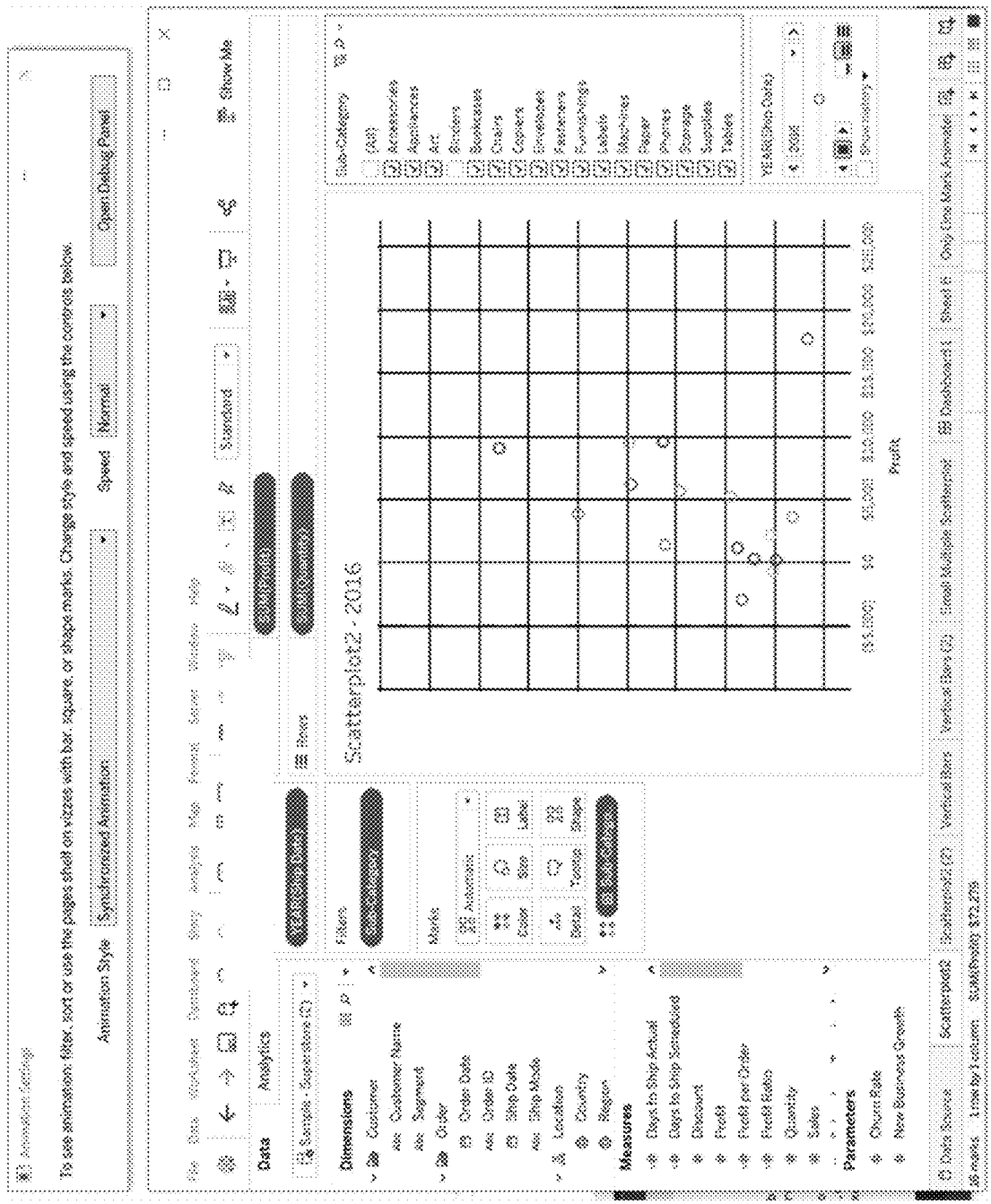
Figure 3C:
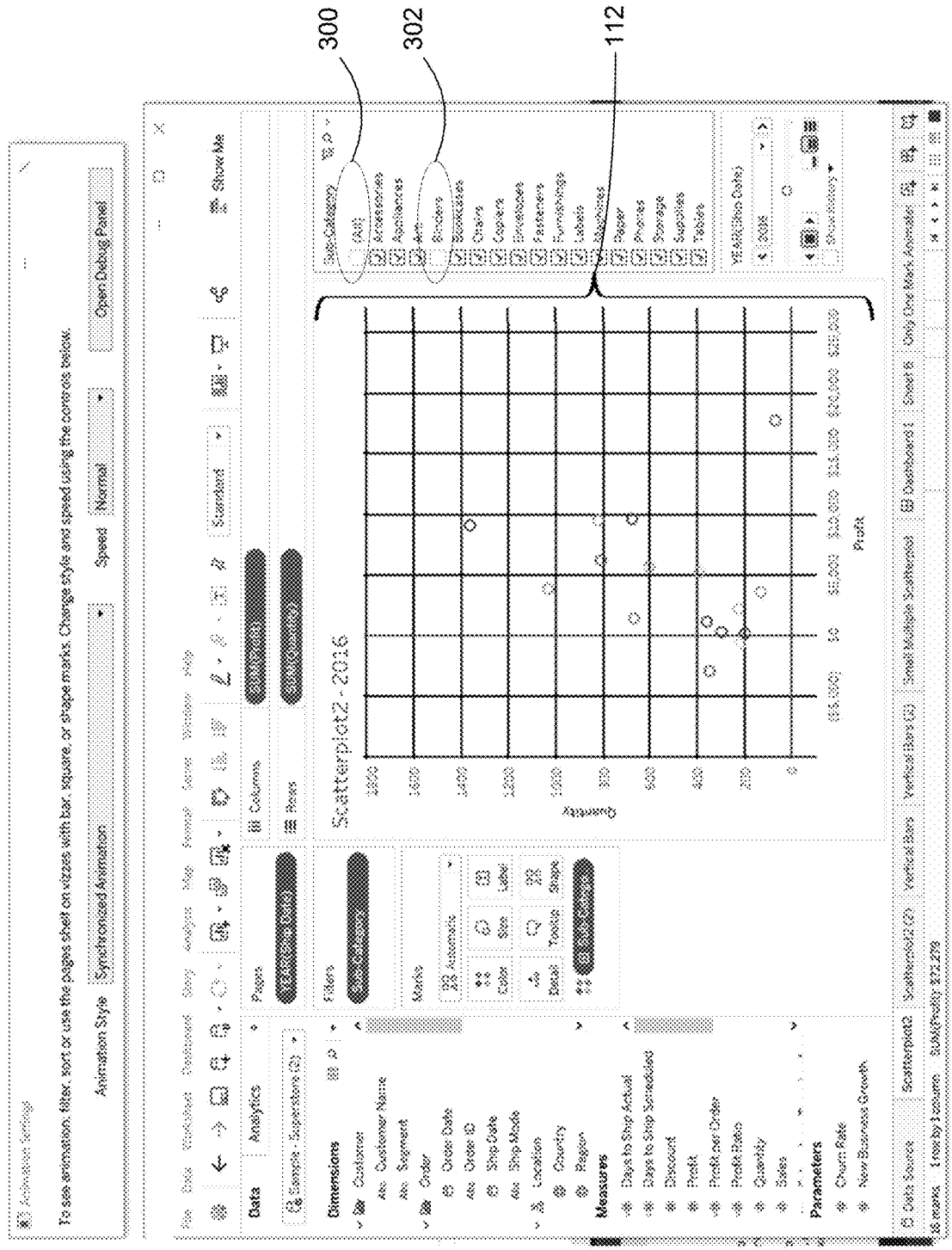

FIGS. 3A-3K provide a series of screen shots for an animated transition of a data visualization. As shown in FIG. 3A, the animation style 114 is set to "synchronized animation" and the speed 116 is set to "normal." A plurality of visual marks (e.g., circles) are included in the data visualization. The data visualization shown in FIG. 3A includes vertical gridlines that represent every $5000 of Profit (e.g., as indicated by the axis shown at the bottom of the data visualization). FIG. 3B shows the addition of horizontal gridlines included in the data visualization. FIG. 3C shows the result of the addition of labels for the horizontal gridlines, which occur at every change of 200 in the Quantity (e.g., as indicated by the axis on the left of the data visualization).

FIG. 3C illustrates a data visualization in a first state that is displayed in the data visualization region 112. Note that a sub-category, "Binders" 302, is not included in the data visualization in FIG. 3C (e.g., as indicated by no check mark next to binders in the filter region 118). In some instances, a user input modifies the filter applied to the data by selecting (or deselecting) categories within the filter region 118. In response to the user input, an animated transition is triggered. For example, in response to a user input selecting "(All)" 300, the data visualization application includes all of the possible sub-categories, including "Binders" 302 (which was not previously included). In response to the user input, an animated transition of the data visualization is triggered in order to add "Binders" to the data visualization.

Figure 3D:
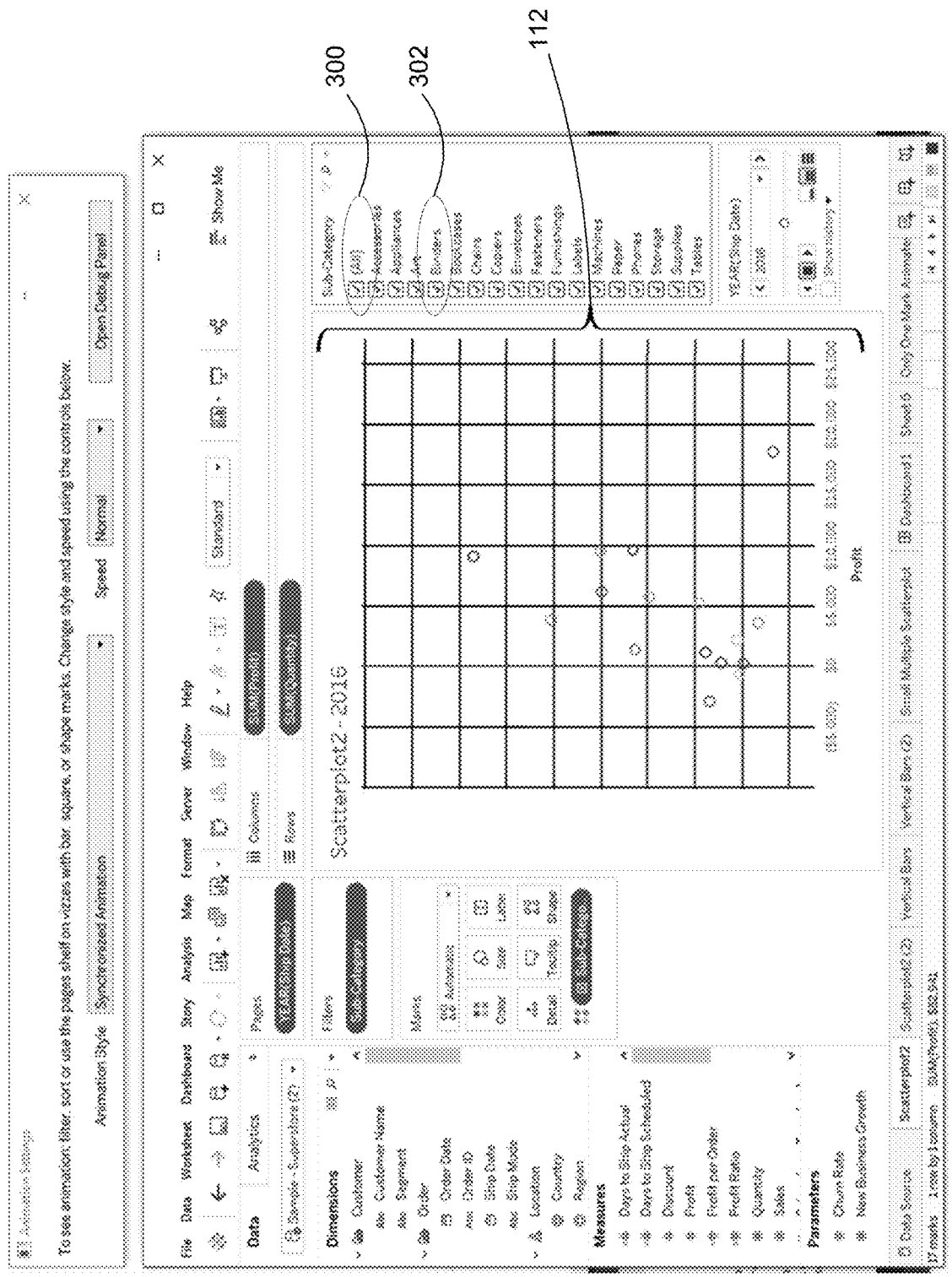
Figure 3E:
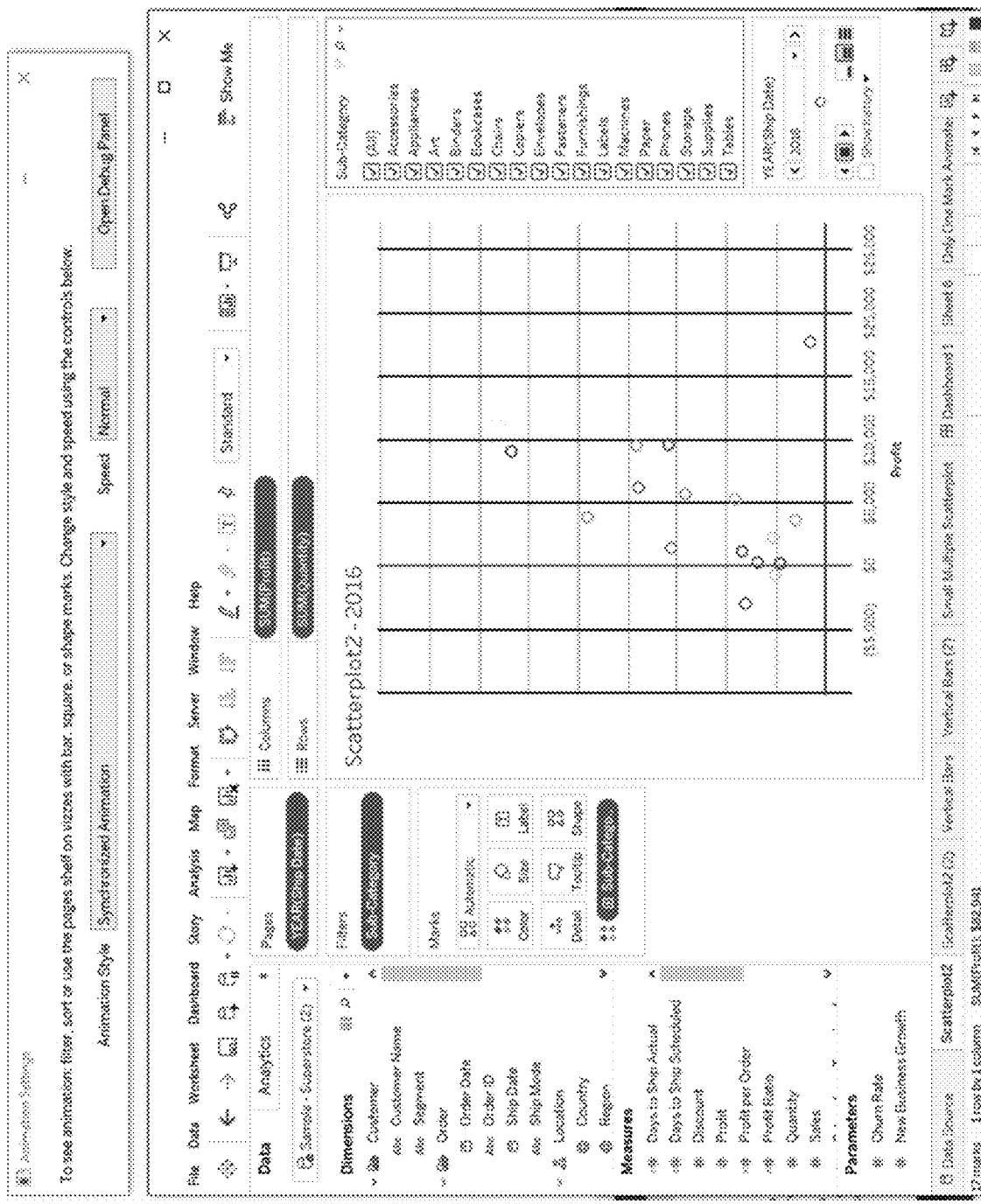
Figure 3F:
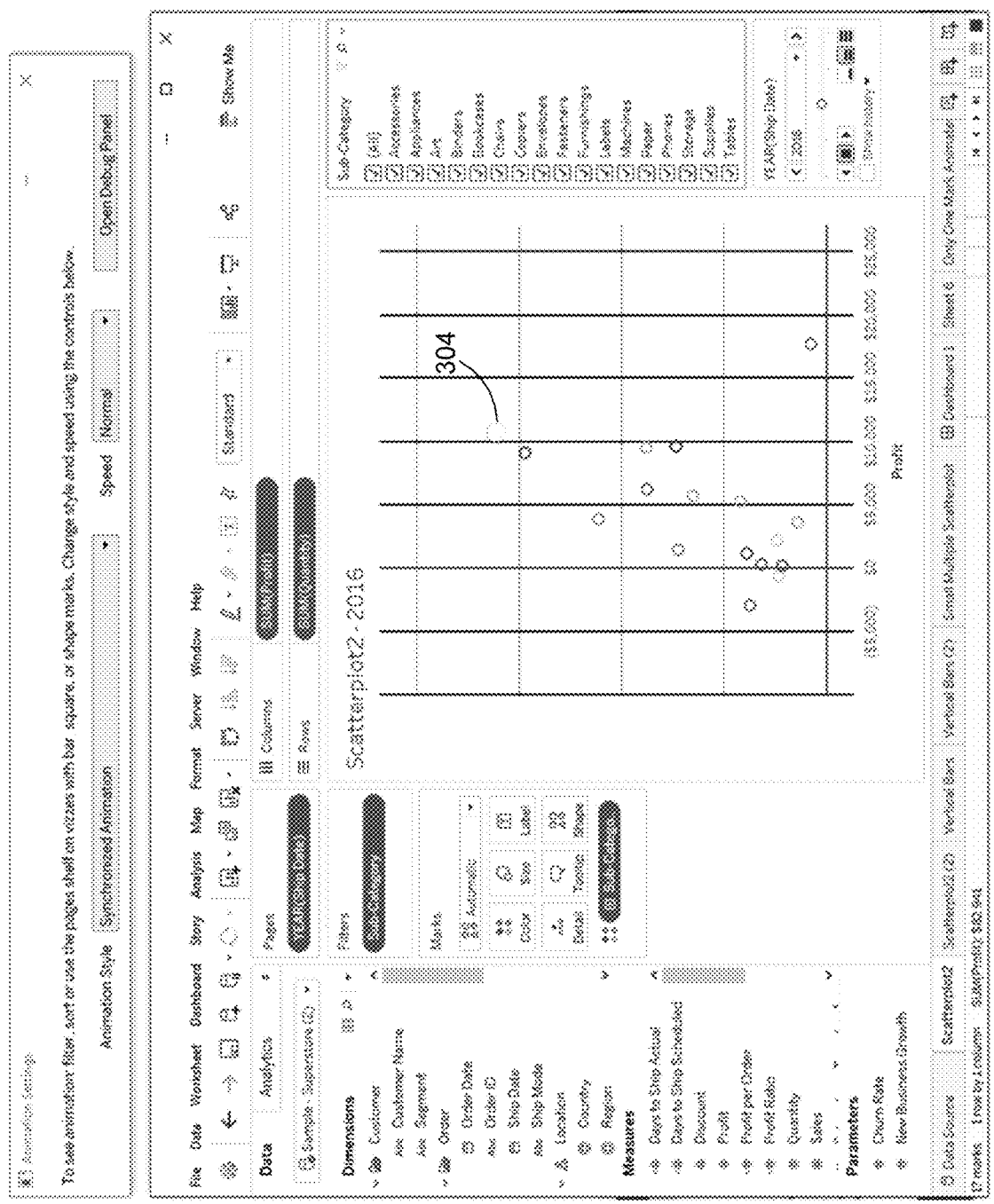
Figure 3G:
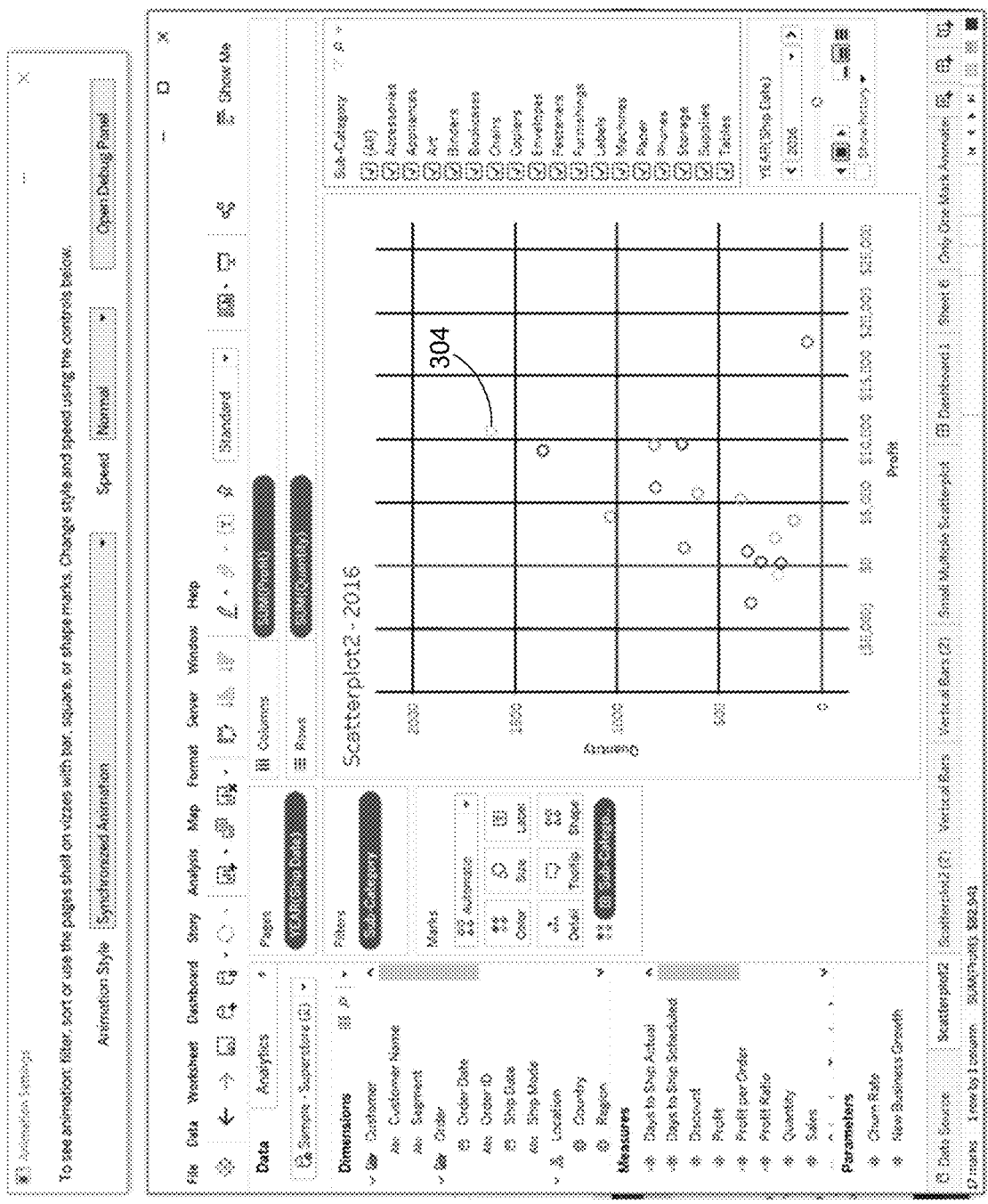

FIGS. 3D-3G illustrate the animated transition between the data visualization in the first state (FIG. 3C) and the data visualization in the second state (FIG. 3G). FIG. 3F illustrates a visual mark 304, which corresponds to data associated with "Binders" and appears in the data visualization during the transition. In this implementation, the visual mark 304 in FIG. 3F is a larger circular mark than the plurality of marks that are already included in the data visualization from the first state. This is an example of the animation including an emphasis of the additional visual mark. The larger circular mark 304 appears, then shrinks into the normal-sized visual mark 304 illustrated in FIG. 3G (e.g., to a size that matches the plurality of other visual marks). Further, the plurality of visual marks shifts downwards in a synchronized manner as the horizontal gridlines are adjusted to account for the additional data. For example, the horizontal gridlines transition to be farther apart from each other (e.g., stretch), as illustrated by the horizontal gridlines in FIG. 3G now representing a change in quantity every 500 units (as opposed to every 200 units, as shown in FIG. 3C).

As illustrated in FIGS. 3D-3F, in some implementations, at least one axis or axis labels are removed during the animated transition. For example, the "Quantity" axis is removed in FIGS. 3D-3F and is displayed once the animated transition is complete, in FIG. 3G. As described above, the horizontal gridlines change during the animated transition as they expand to represent a change in every 500 units instead of 200 units. Further, the quantity axis in FIG. 3G extends to 2000 units, whereas the quantity in FIG. 3C displays a maximum of 1800 units.

Figure 3H:
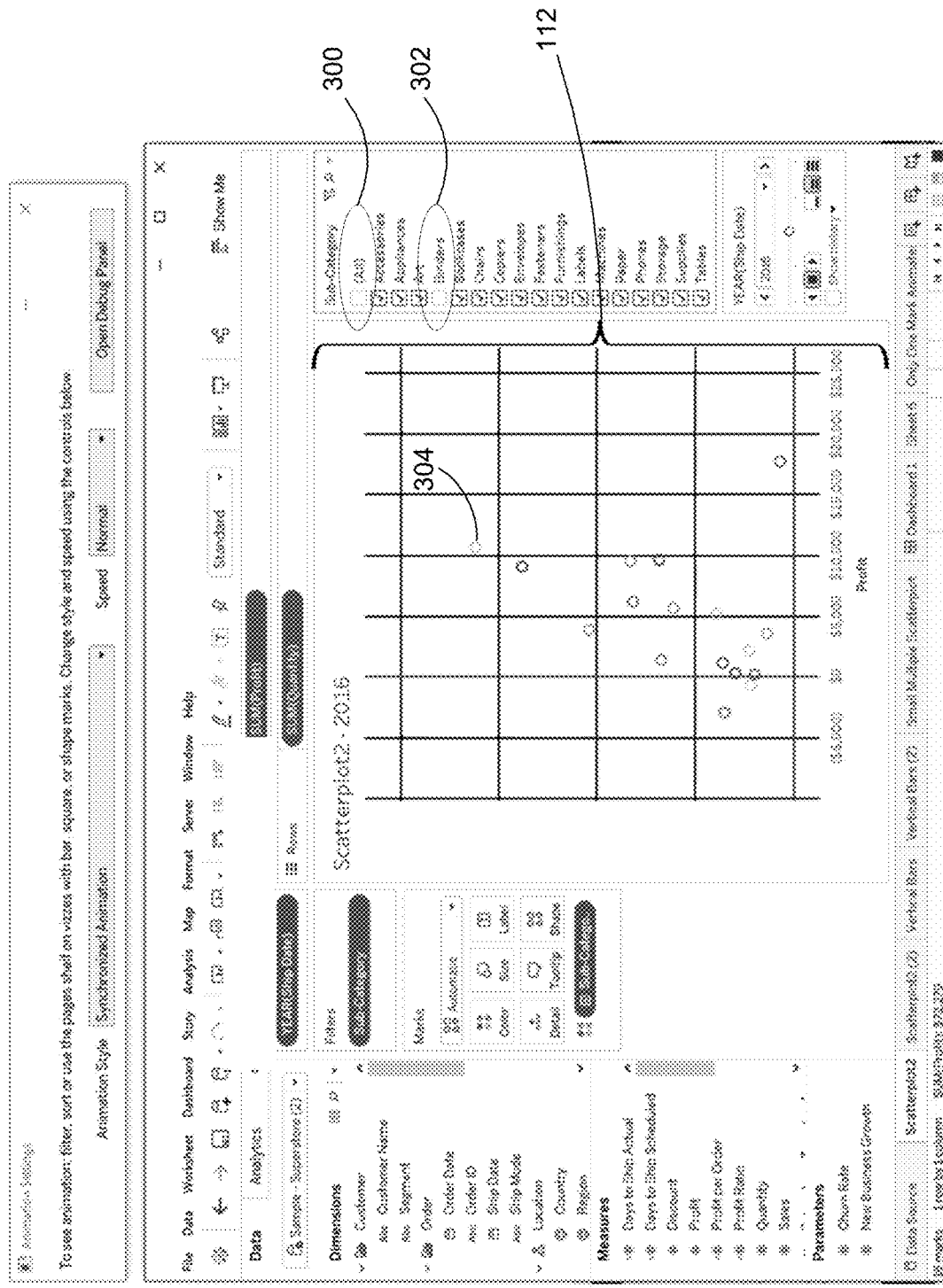
Figure 3I:
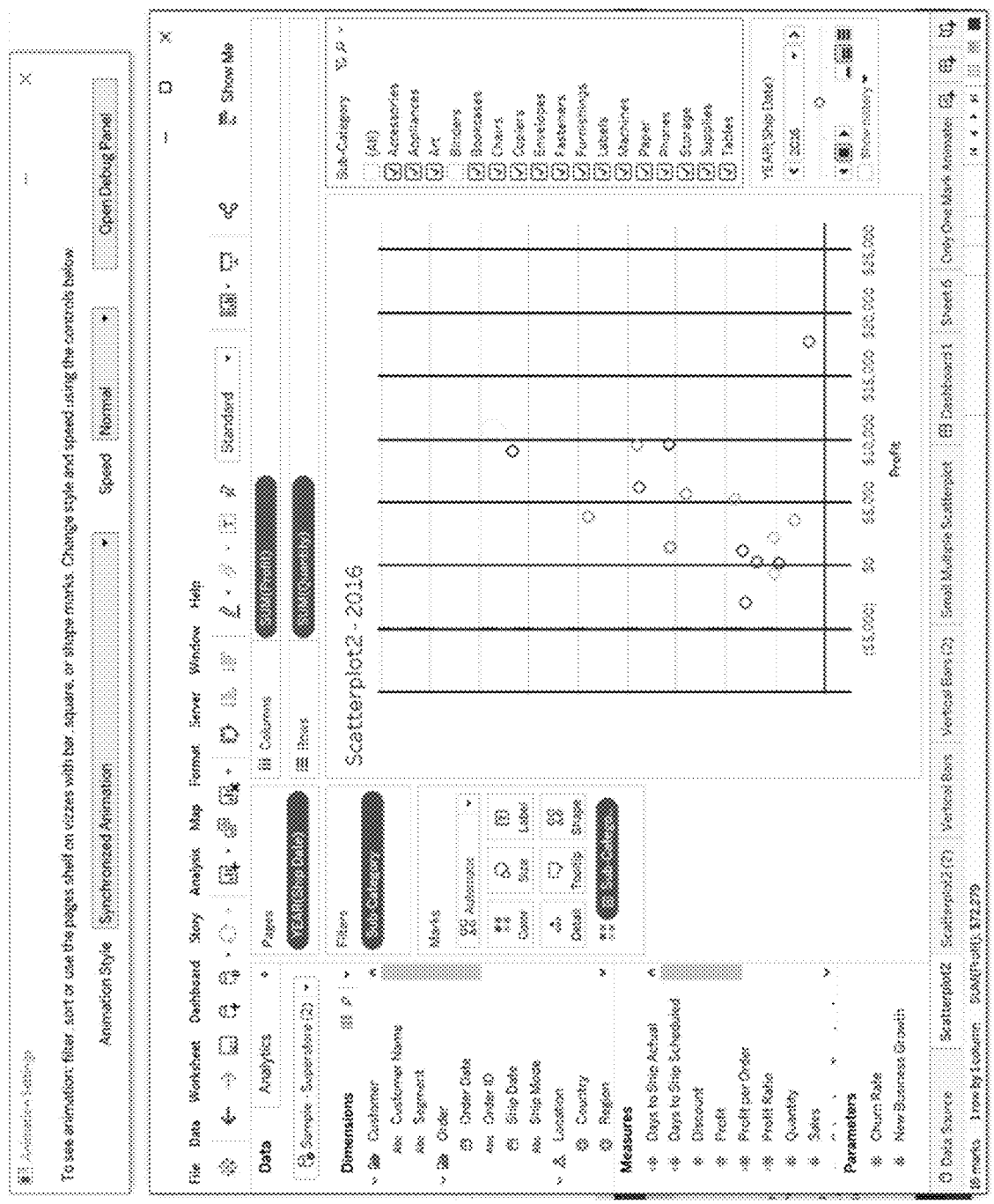
Figure 3J:
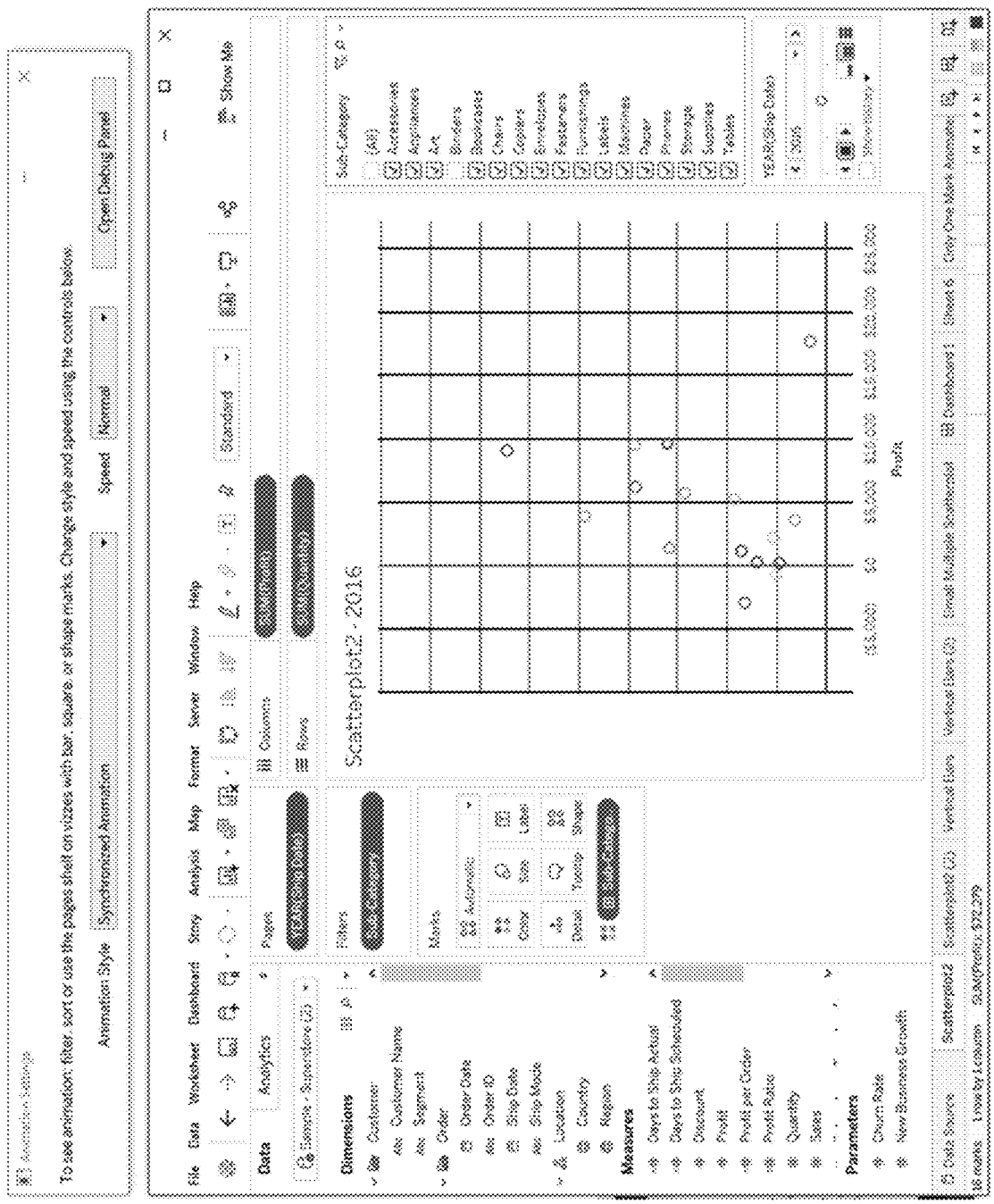
Figure 3K:
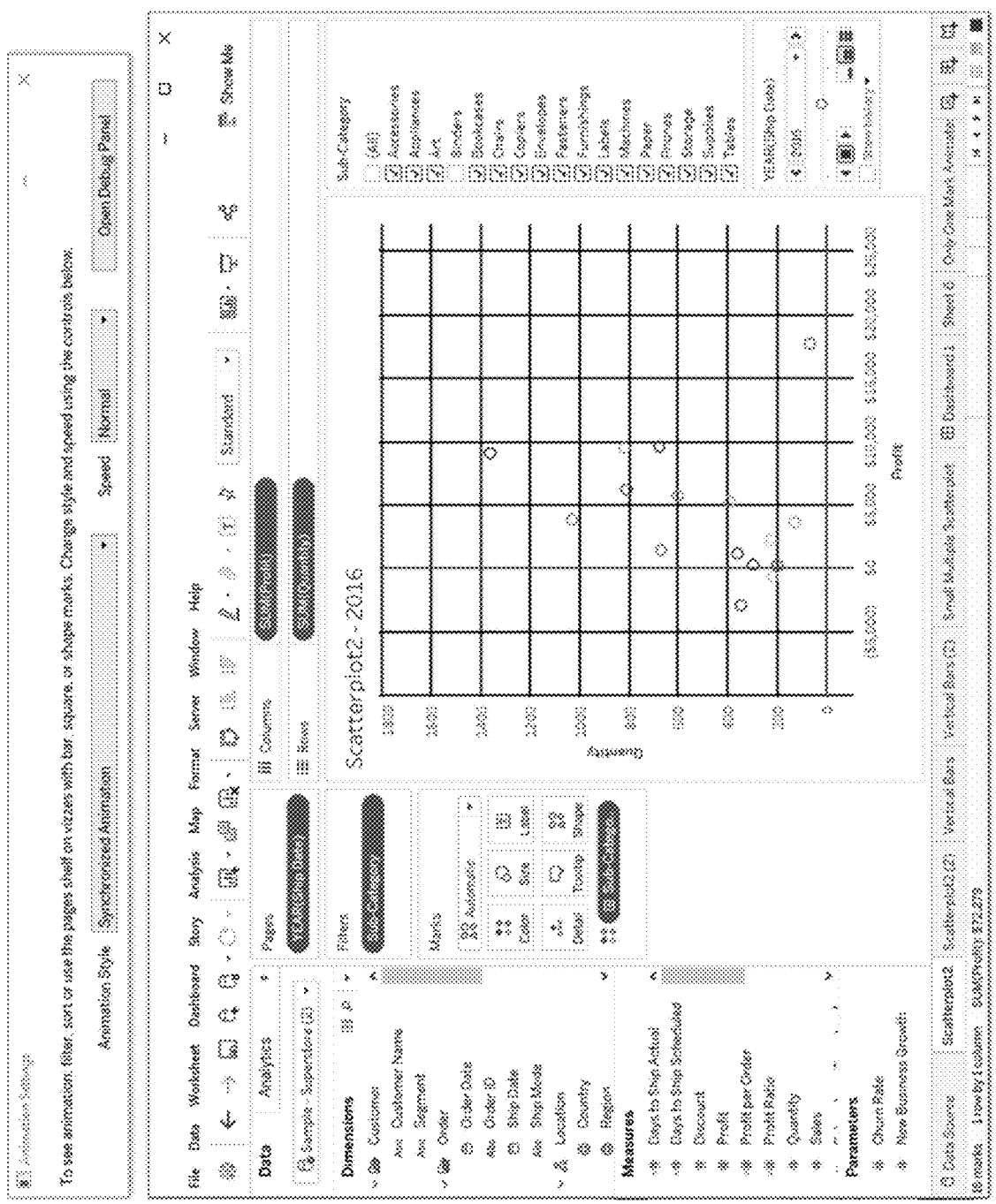

FIG. 3H illustrates a second user input that deselects "Binders" 302. Note that when any of the sub-categories, such as "binders," are deselected, the computing device also deselects the (All) selection 300. In response to the user input to deselect "Binders" 302, an animated transition is triggered to remove the visual mark 304 corresponding to "Binders." FIGS. 3I and 3J illustrate the animated transition, including the horizontal gridlines moving closer together and additional horizontal gridlines appearing. The example animation in FIGS. 3H-3K illustrates a synchronized animation similar to the synchronized animation in FIGS. 3C-3G, but in reverse.

FIGS. 4A-4M provide a series of screen shots for animated transitions for different types of data visualizations. The animated transitions are triggered in response to various user inputs. FIG. 4A illustrates a first sheet, "Scatterplot 2" 404, which is selected and displayed. The graphical user interface shows that this sheet includes "SUM(Profit)" 400 in the column shelf. The mark type selector 122 is set to "Automatic" and shows that the mark type has been set to "Shape" (e.g., as indicated by the 4 shape indictor shown in the mark type selector). Thus, the data visualization shown illustrates a scatterplot with circular shapes as the visual marks. FIG. 4A also illustrates a debug panel 408 (which also includes an animation settings interface 113 in this example). The debug panel 408 illustrates various parameters that determine how an animated transition is displayed. For example, for the scatterplot scenario of FIG. 4A, the debug panel 408 defines an animation style, a speed of the animation, a duration of the animation, how the animation handles data marks that enter, move, or exit the data visualization, and how non-marks (i.e., elements not corresponding to data marks) will move.

Figure 4B:
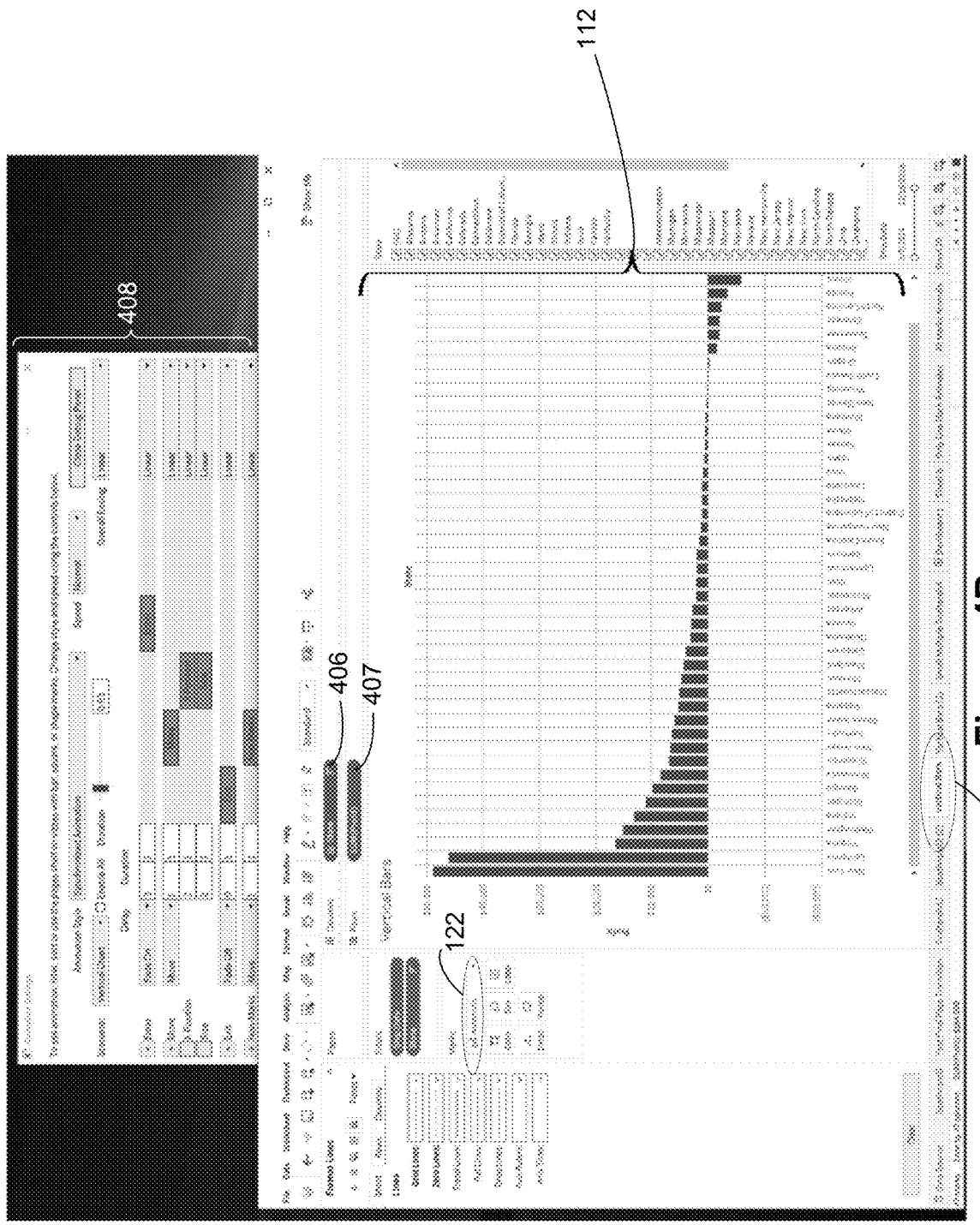

In FIG. 4B the data visualization (for the "Vertical Bars" tab 409) is a vertical bar chart based on the data fields State 406 on the column shelf and the Profit data field 407 on the row shelf. The mark type selector 122 indicates that it is a bar chart. Depending on the data to be represented (e.g., as indicated by the column and row shelves), different view types are selected in order to best represent the selected data. The debug panel 408 illustrated in FIG. 4B shows a plurality of additional settings that are associated with the vertical chart view type. For example, under the "move" setting, the animation of X position and Size can be changed using the debug panel 408.

Figure 4C:
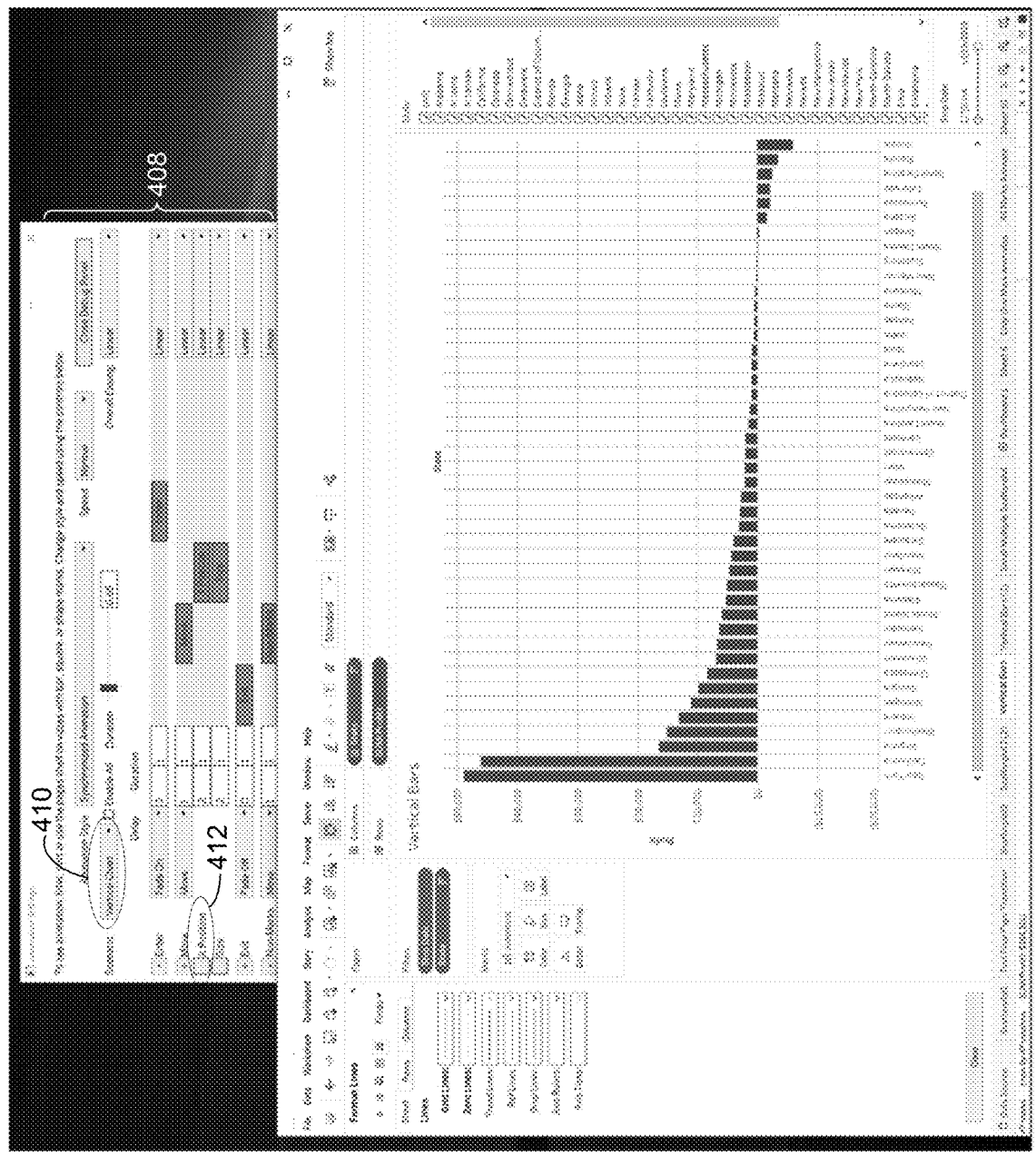

FIG. 4C illustrates the animation settings 408. In some implementations, the debug panel 408 comprises a user interface that allows a user (e.g., an animation developer/analyst) to customize the default parameterization or create new default animations for the various data visualizations. The user can set values for each parameter of the animations. The debug panel 408 illustrates that the selected "Scenario" is "Vertical chart" 410. A corresponding option to modify the animation related to "X position" 412 is also provided in the animation settings. The data visualization in FIG. 4C comprises a vertical bar chart.

Figure 4D:
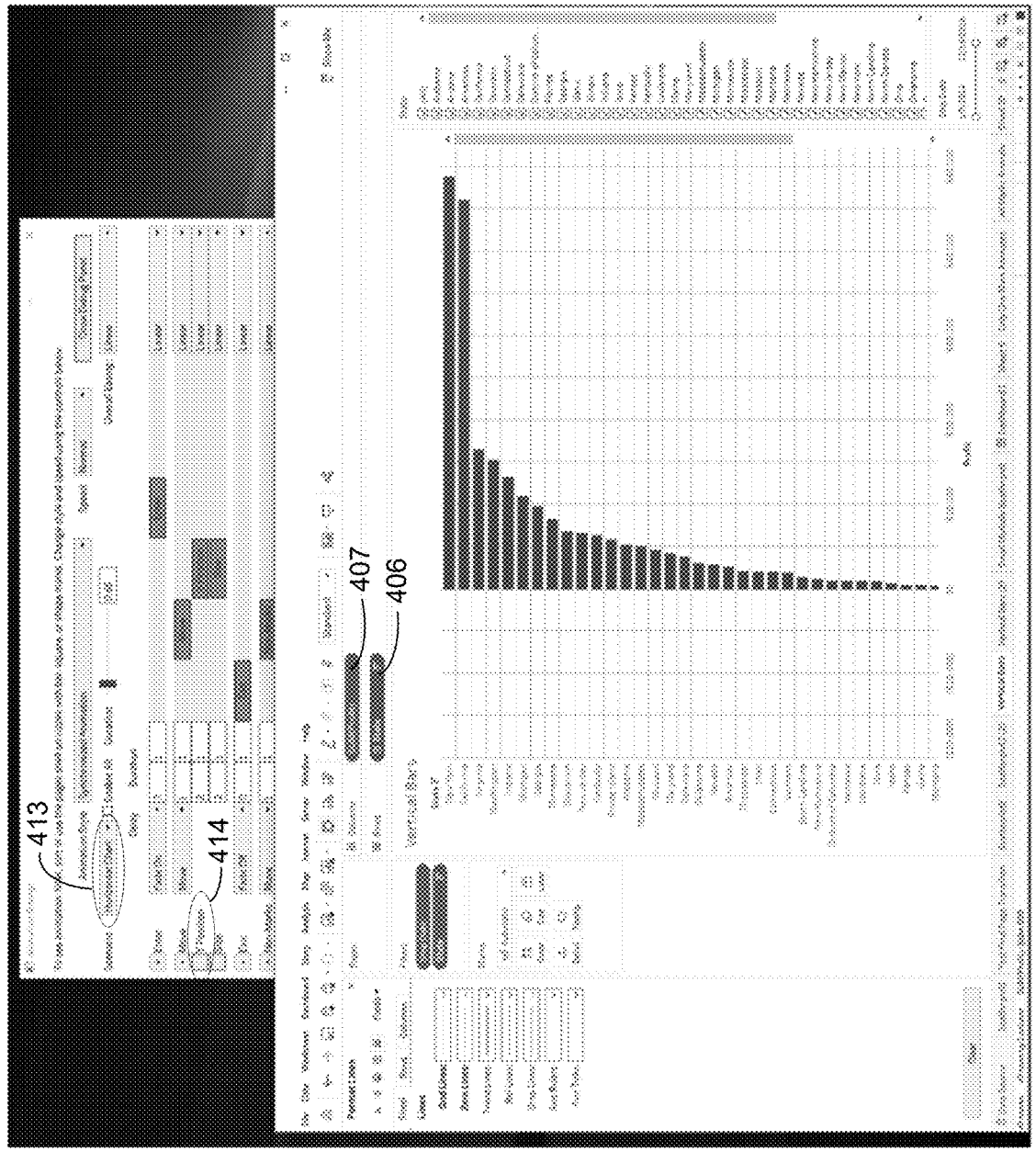

In FIG. 4D, a user has switched the roles of the data fields State 406 and Profit 407, creating a horizontal bar chart, as indicated in the horizontal chart scenario 413 in the debug window. Because it is a horizontal chart, the Y position animation element 414 now appears in the debug window instead of the X position element 412 shown previously. This controls the animation of vertical movement for marks that move.

Figure 4E:
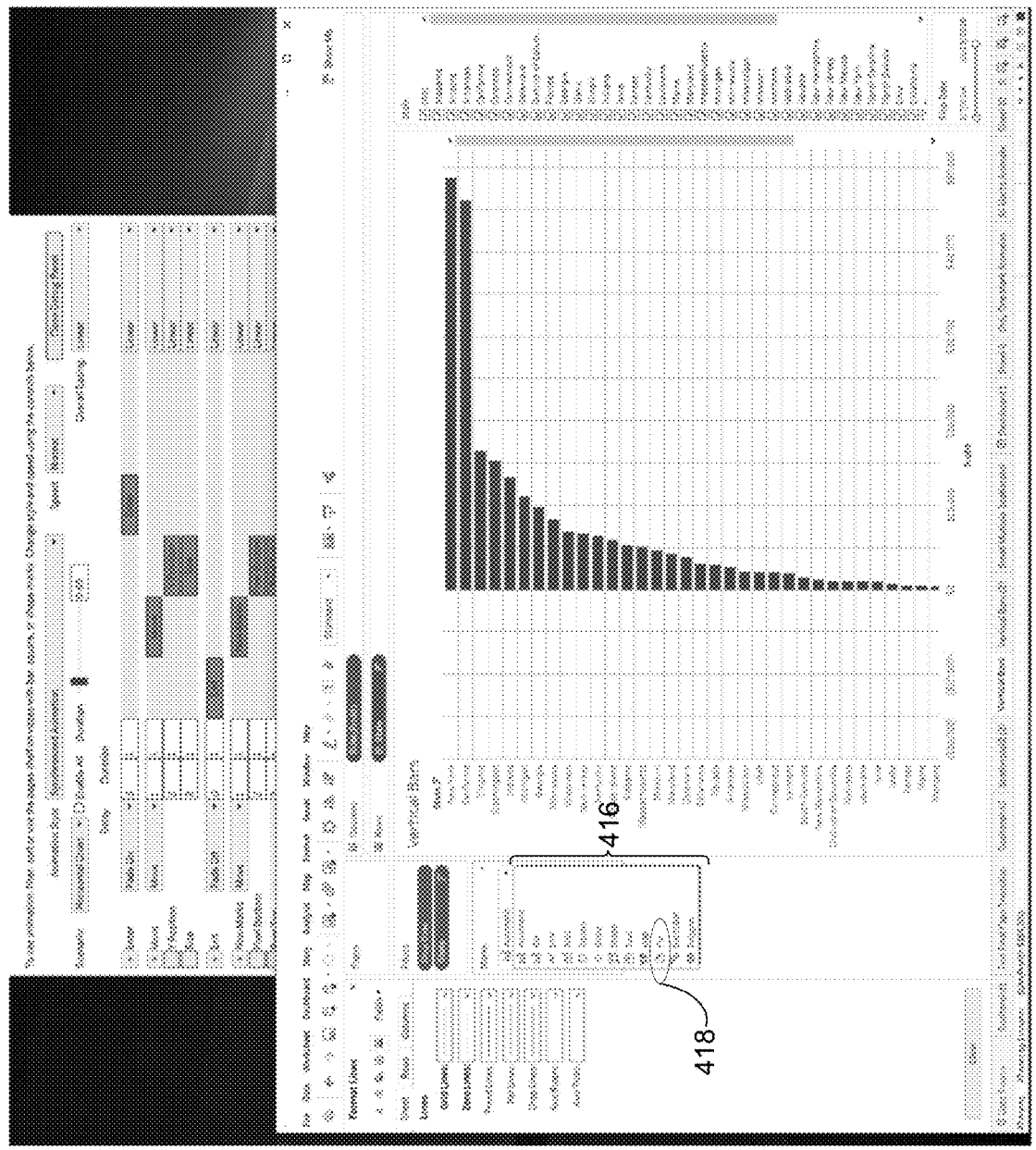
Figure 4F:
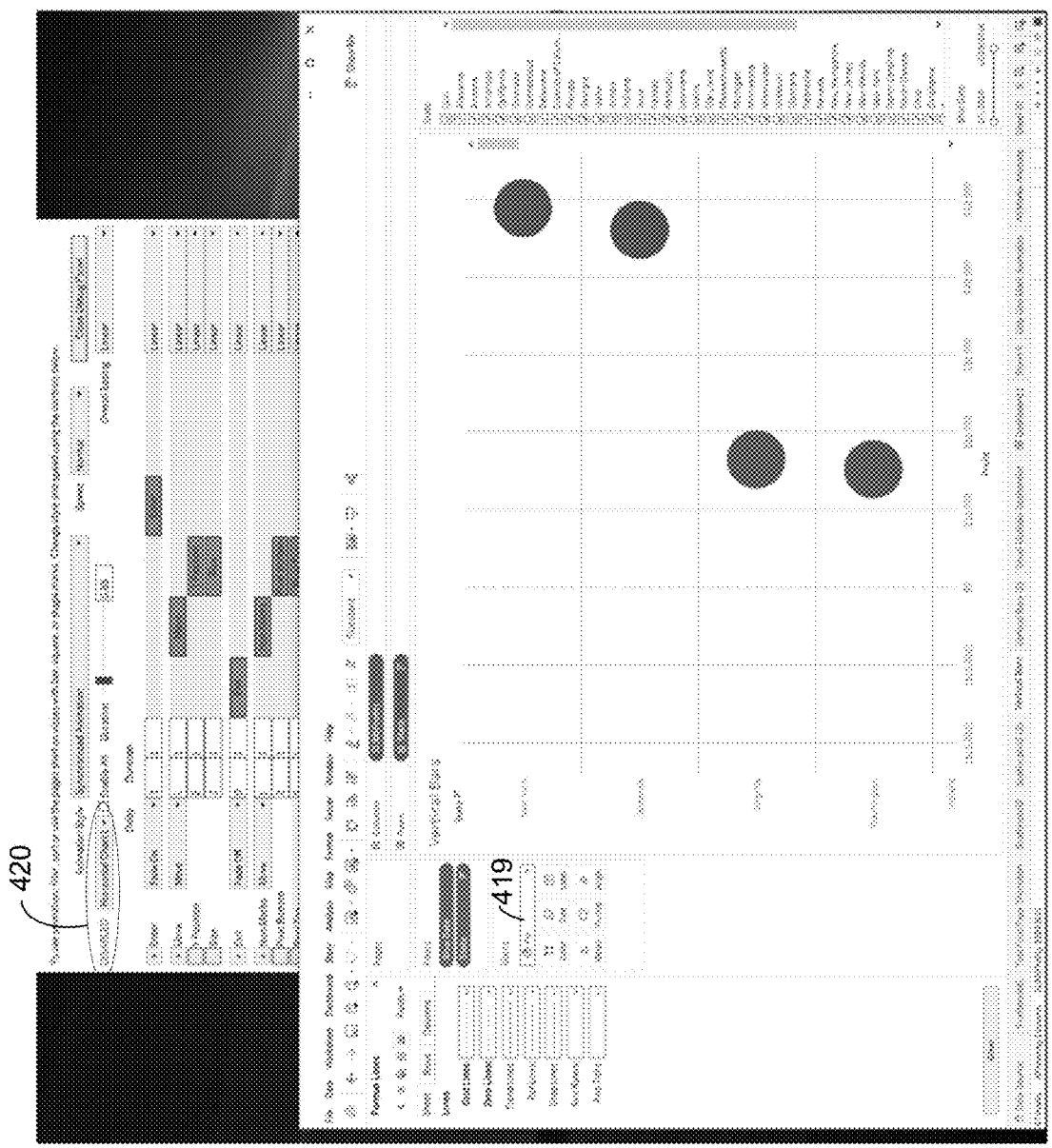
Figure 4G:
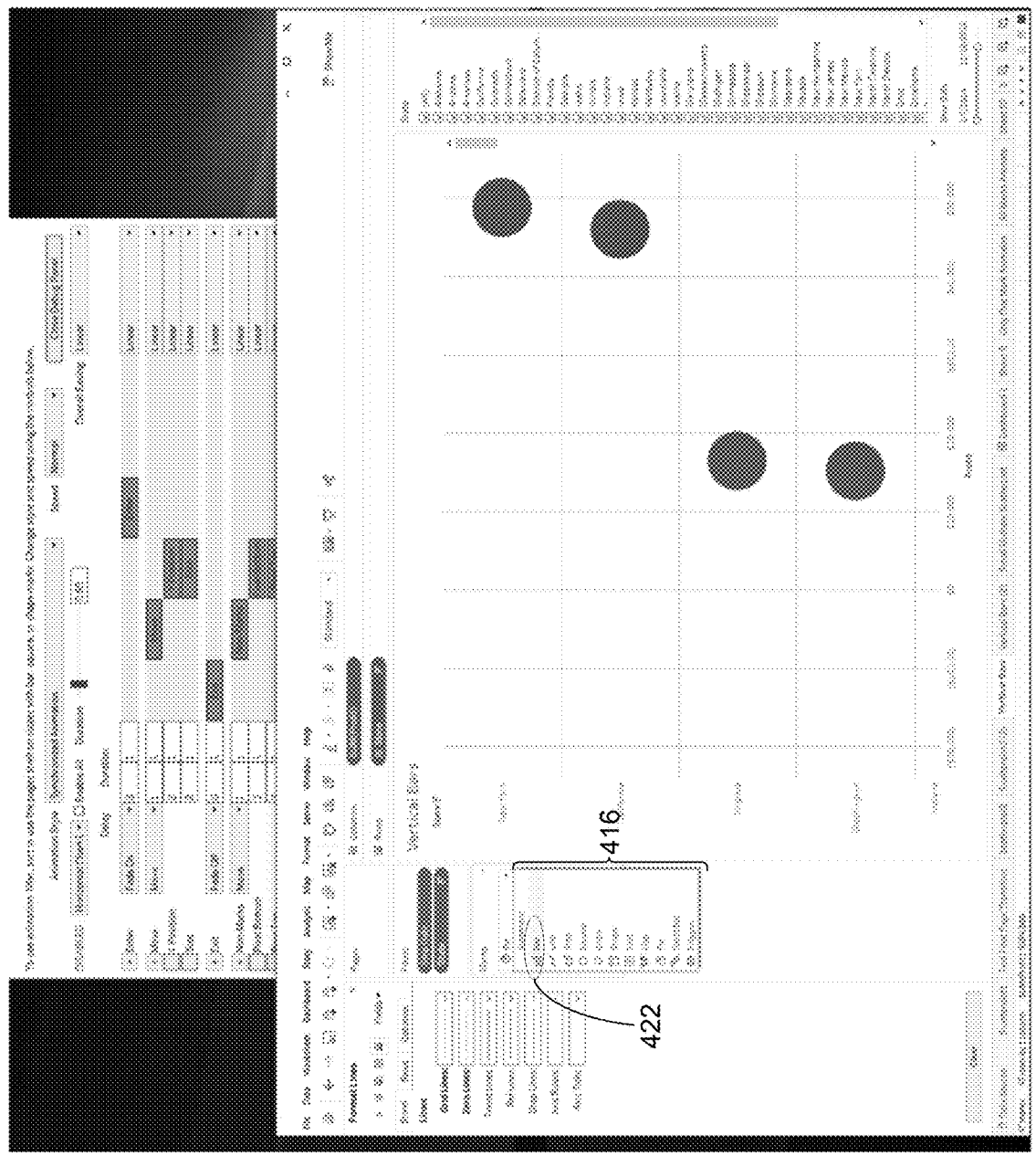

FIG. 4E illustrates a dropdown 416 of the mark type selector 122. A user can select an option from the dropdown 416 to change the mark type from the default (e.g., "Automatic") to another mark type. For example, the user selects the "Pie" option 418, and in response to the user input, the data visualization is updated from the horizontal bar chart to use pie marks according to the pie selection 419, as illustrated in FIG. 4F. As illustrated in the animation settings shown in FIG. 4F, the scenario for "Horizontal Chart" 420 has been "Disabled" in response to the user input to change the mark type because the usual animation cannot be applied to pie marks here.

Figure 4H:
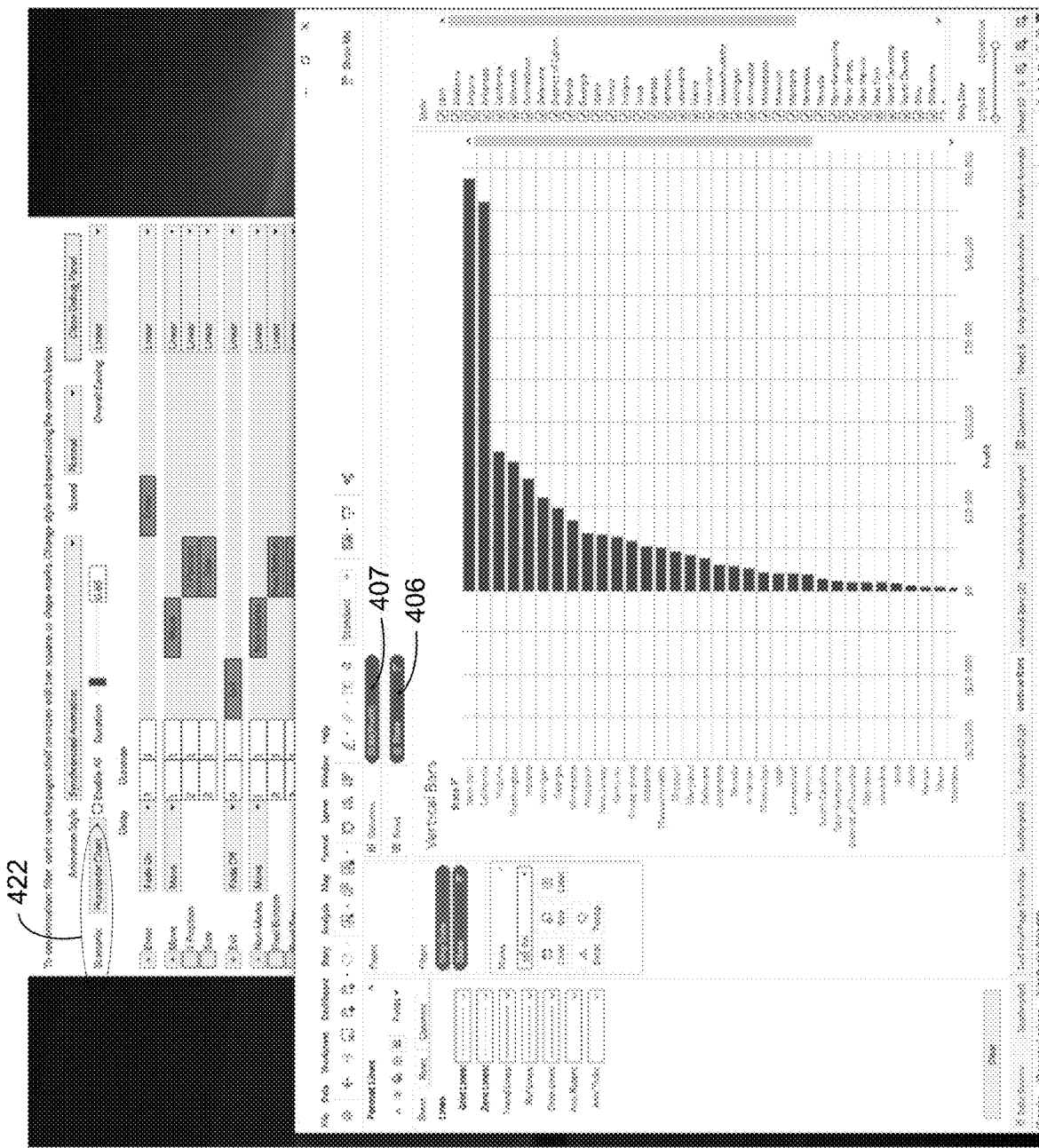

FIG. 4G illustrates the dropdown 416 of the mark type selector 122. In FIG. 4G, the user selects "Bar" 422 as the mark type. In response to the user input, the data visualization is updated to a standard bar chart, as illustrated in FIG. 4H. The scenario for "Horizontal Chart" 422 is no longer disabled because standard bar chart animations are available again.

Figure 4I:
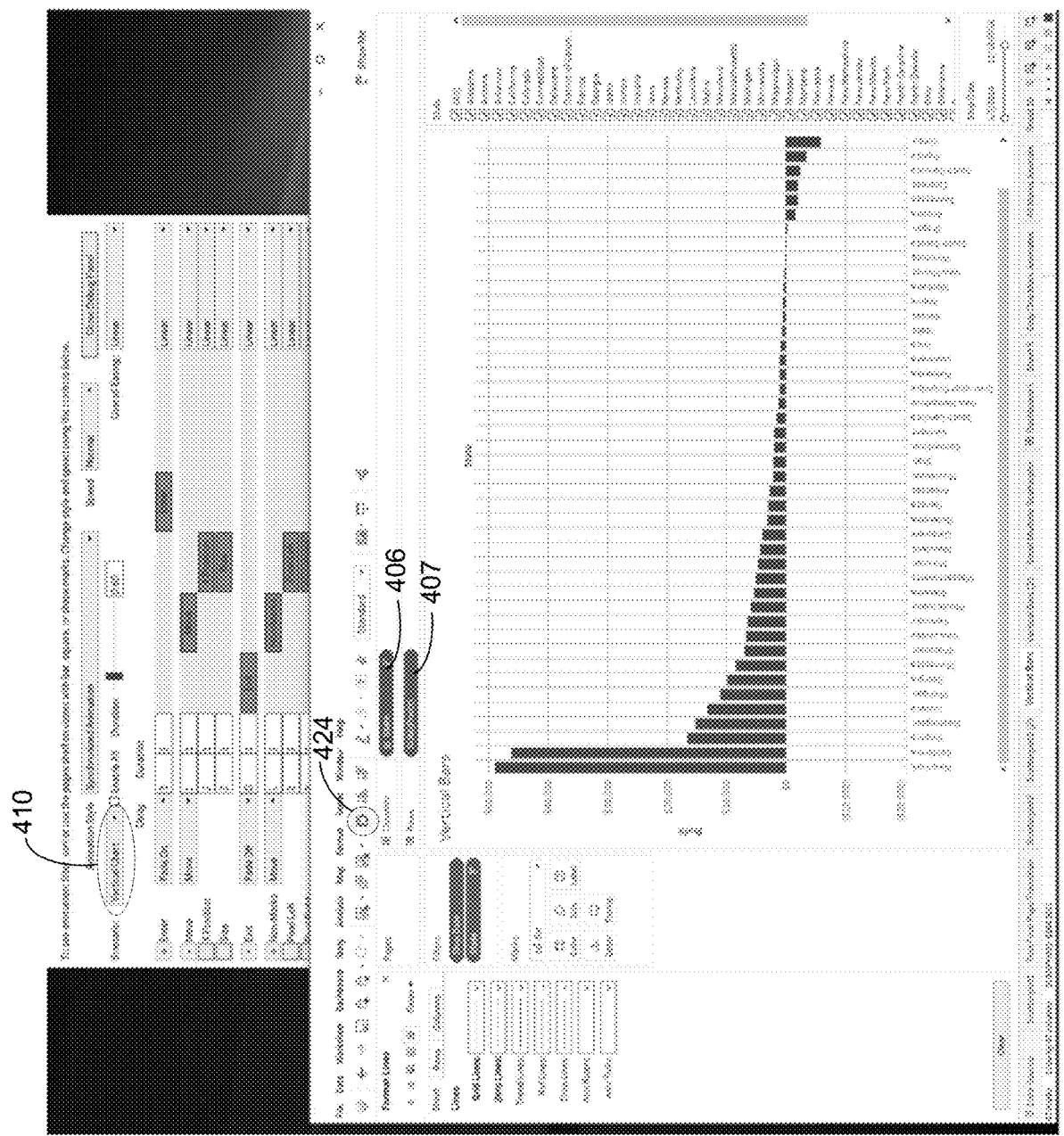

FIG. 4I illustrates a user input 424 to swap the X and Y axes. For example, FIG. 4H illustrates the State on the Y axis and the Profit on the X axis (corresponding to the placements of the data fields State and Profit in the rows and columns shelves). In response to user input 424, the data fields in the rows and columns shelves are swapped, causing the axes to switch: the Profit now appears on the Y axis while the State appears along the X axis. Based on this, the Vertical Chart scenario 410 now appears in the debug window. Another example of the axes switching is shown in FIGS. 4C and 4D above.

Figure 4J:
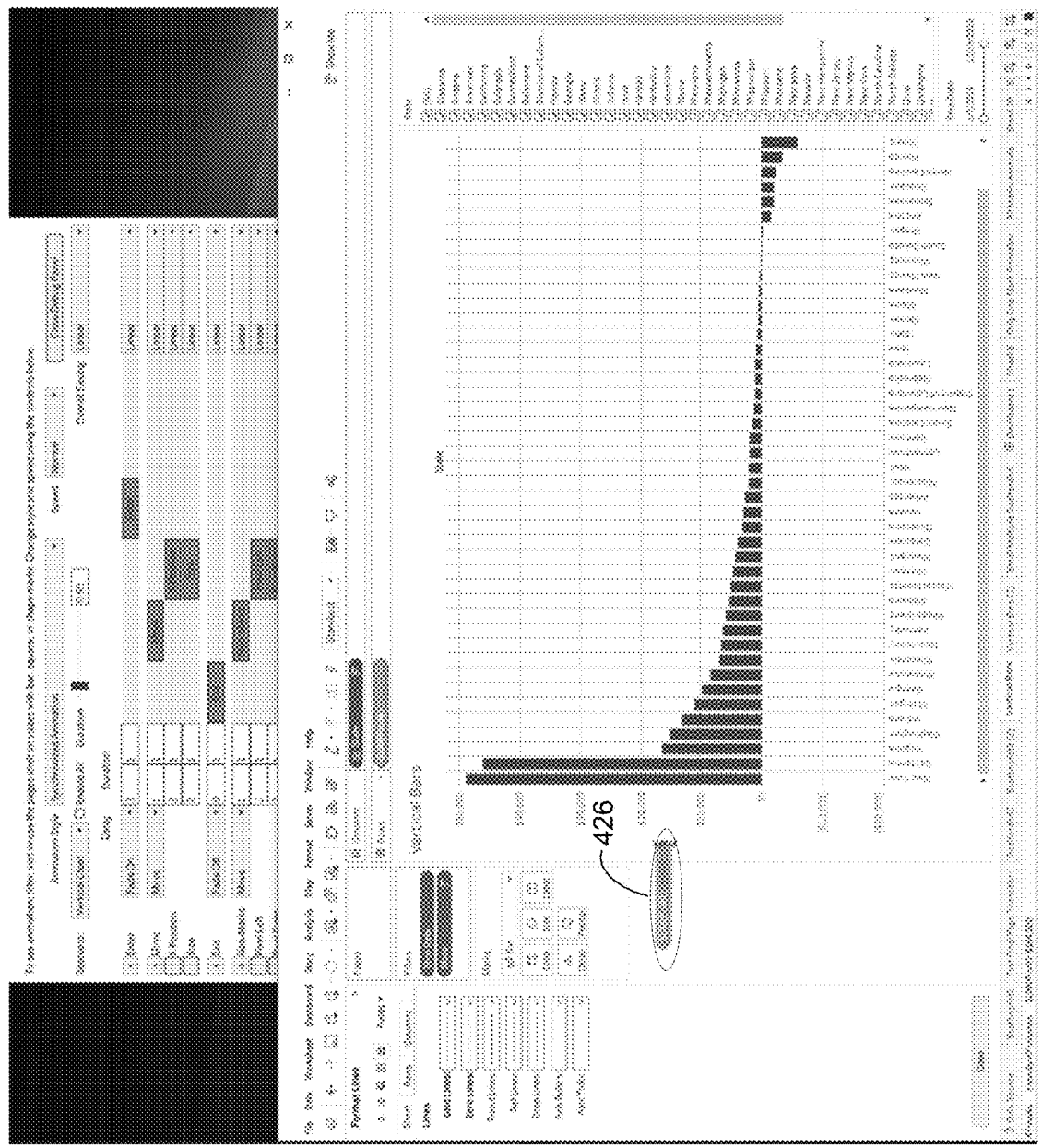
Figure 4K:
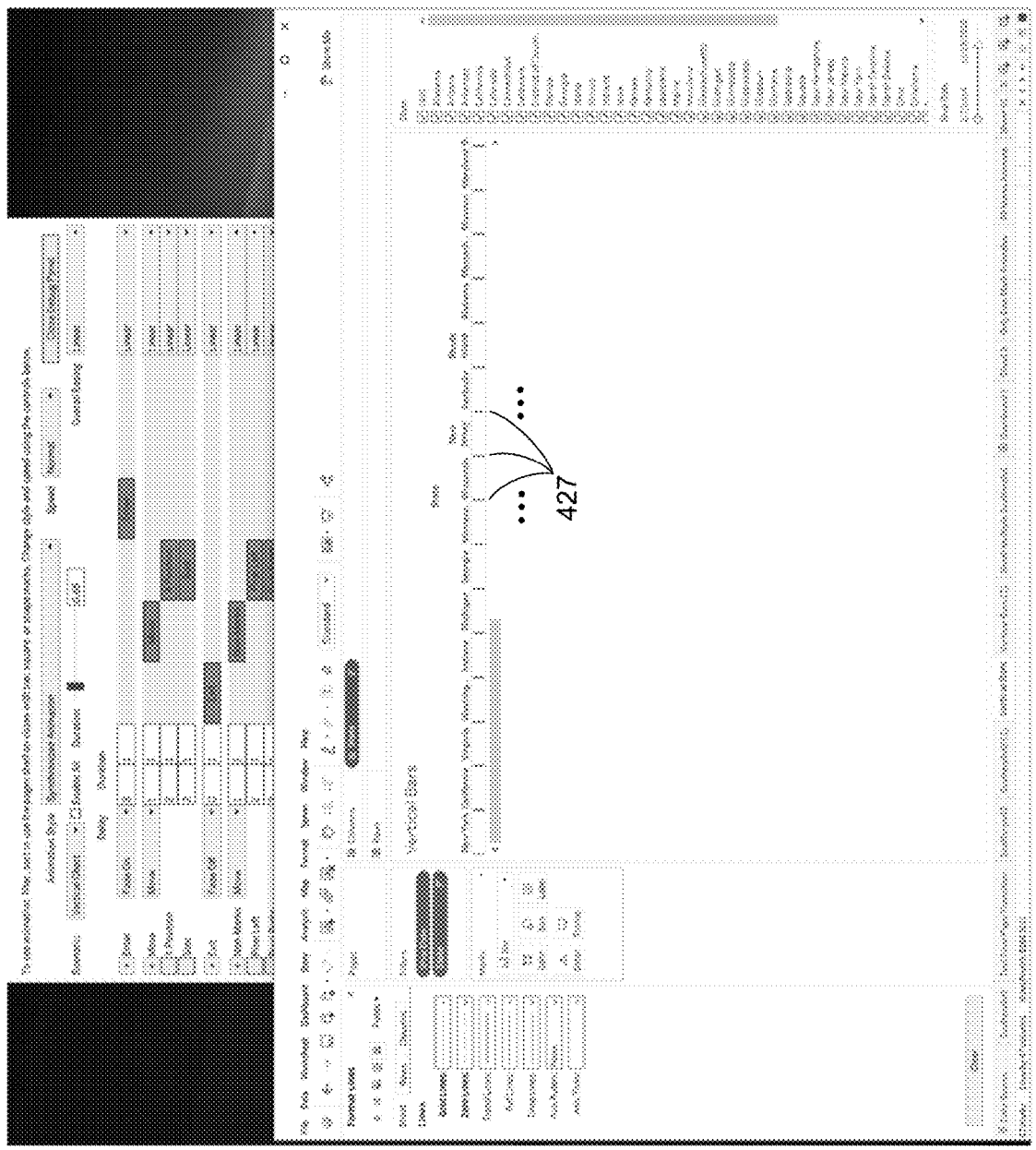

FIG. 4J illustrates a user input that removes "Sum(Profit)" 426 from the rows shelf. For example, the user input selects "Sum(Profit)" 407 and drags the selection off of the rows shelf, as shown in FIG. 4J. FIG. 4K illustrates that, in response to the user input removing "Sum(Profit)" from the rows shelf, the data visualization is updated to represent the remaining data corresponding to "State" on the column shelf. All of the "bars" 427 are the same size because they are no longer based on a measure data field.

Figure 4L:
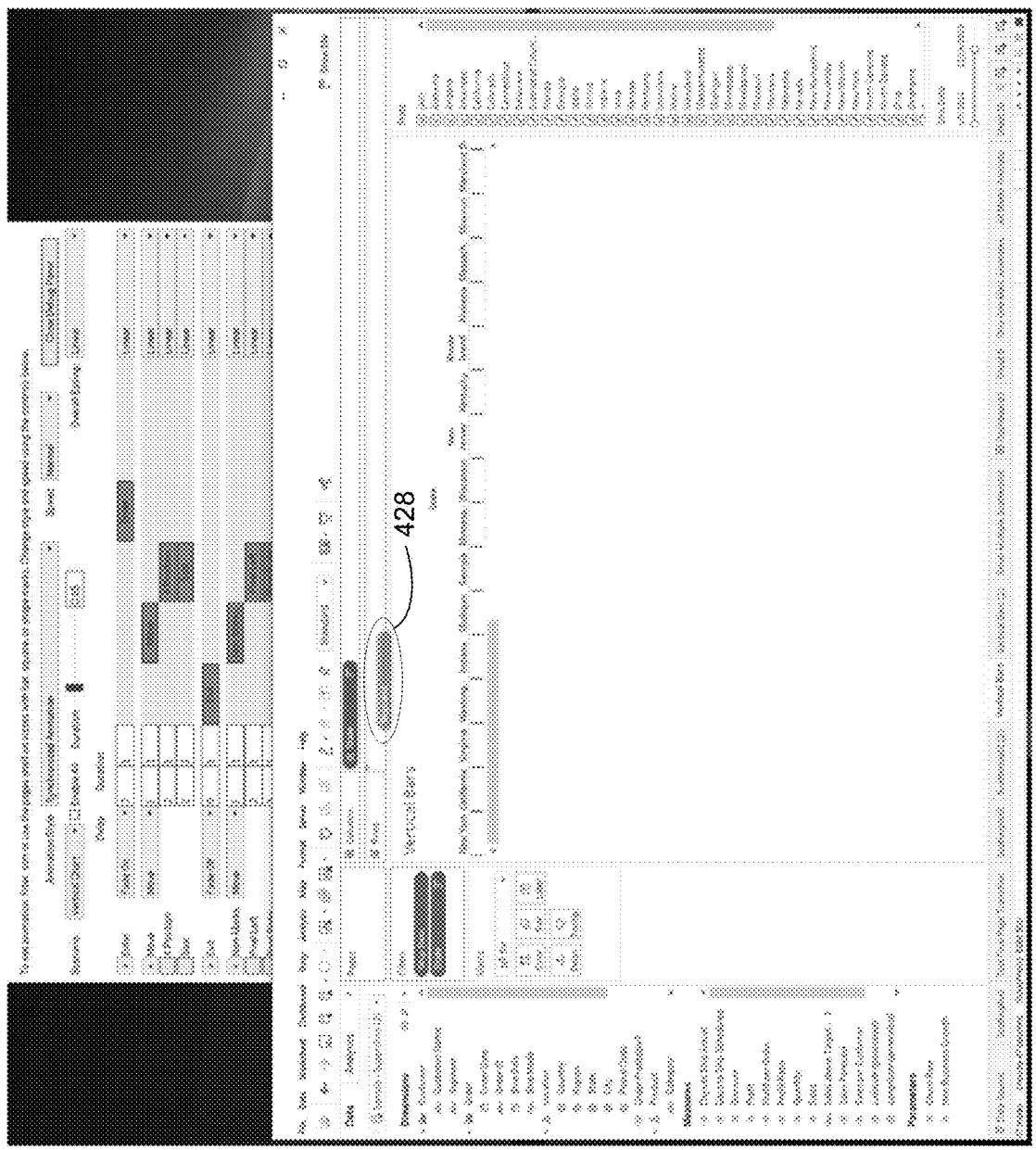
Figure 4M:
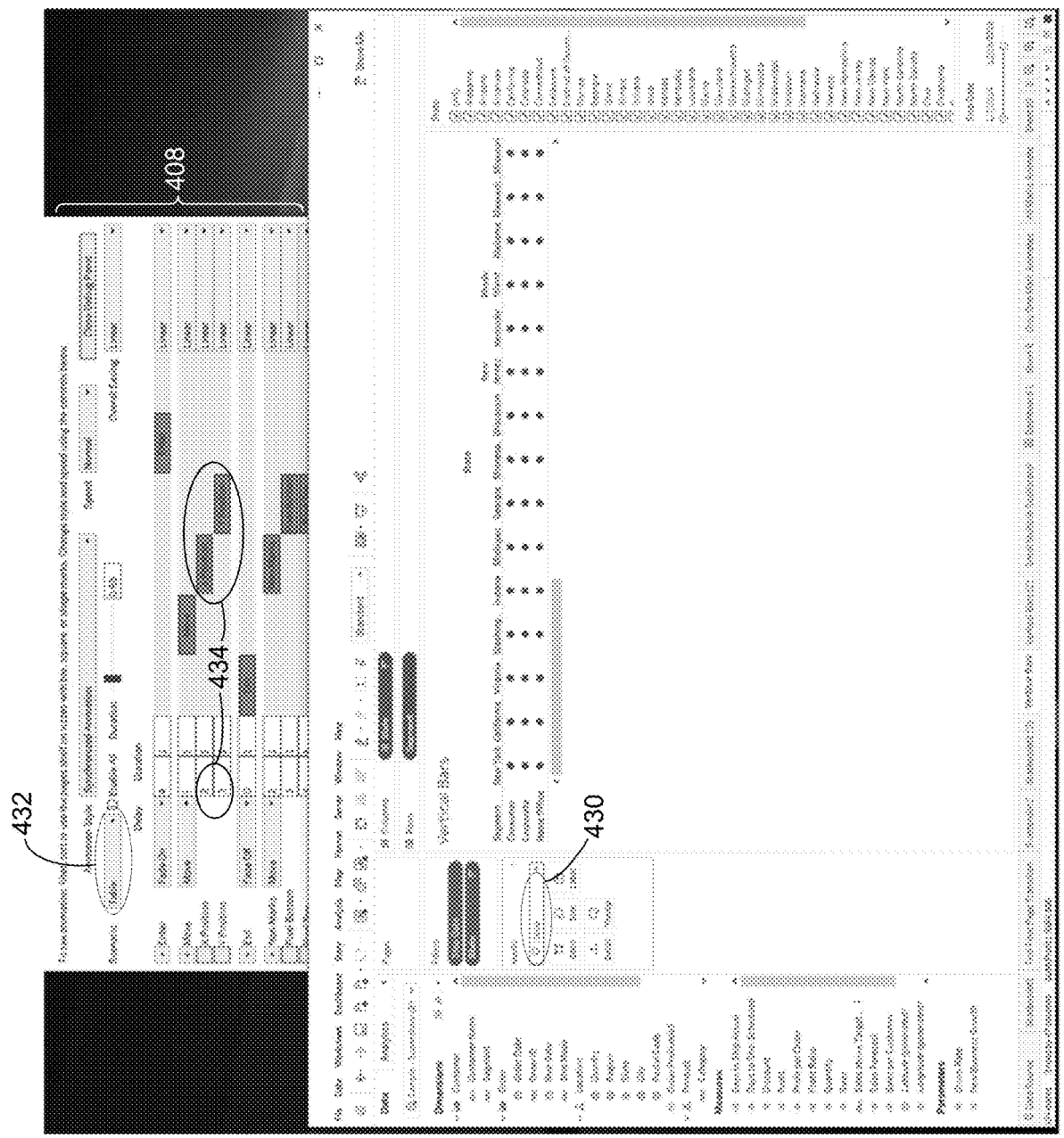

FIG. 4L illustrates a user input selecting a "Segment" dimension 428 and placing it (e.g., via drag and drop) on the rows shelf. FIG. 4M shows the resulting data visualization that is updated in response to the user adding the "Segment" dimension to the rows shelf. The user has also selected a "Circle" mark type 430 for the data visualization in FIG. 4M. Because there are now dimension data fields on both the rows shelf and the columns shelf, the data visualization is displayed as a text table. Because of this, the debug window shows the Table scenario 432 and corresponding animation options (e.g., options for the animation of both the X-position and Y-position). In the default option, animation of mark movement of the X position of data marks occurs before the movement of the Y position, as indicated by the move selection 434 in the debug window.

Figure 5A:
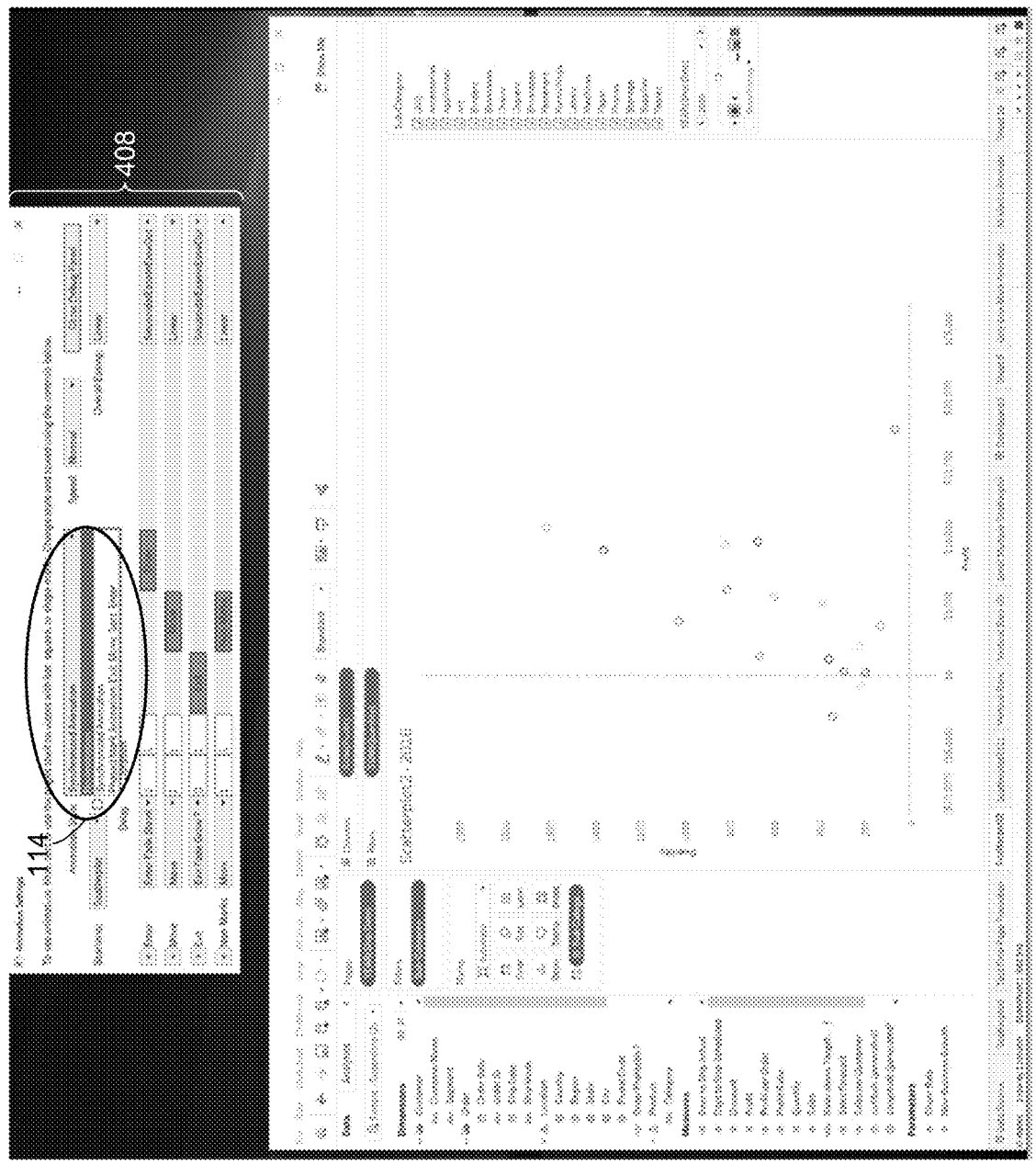
FIGS. 5A-5N illustrate updating animation settings for transitions according to some implementations.
Figure 5B:
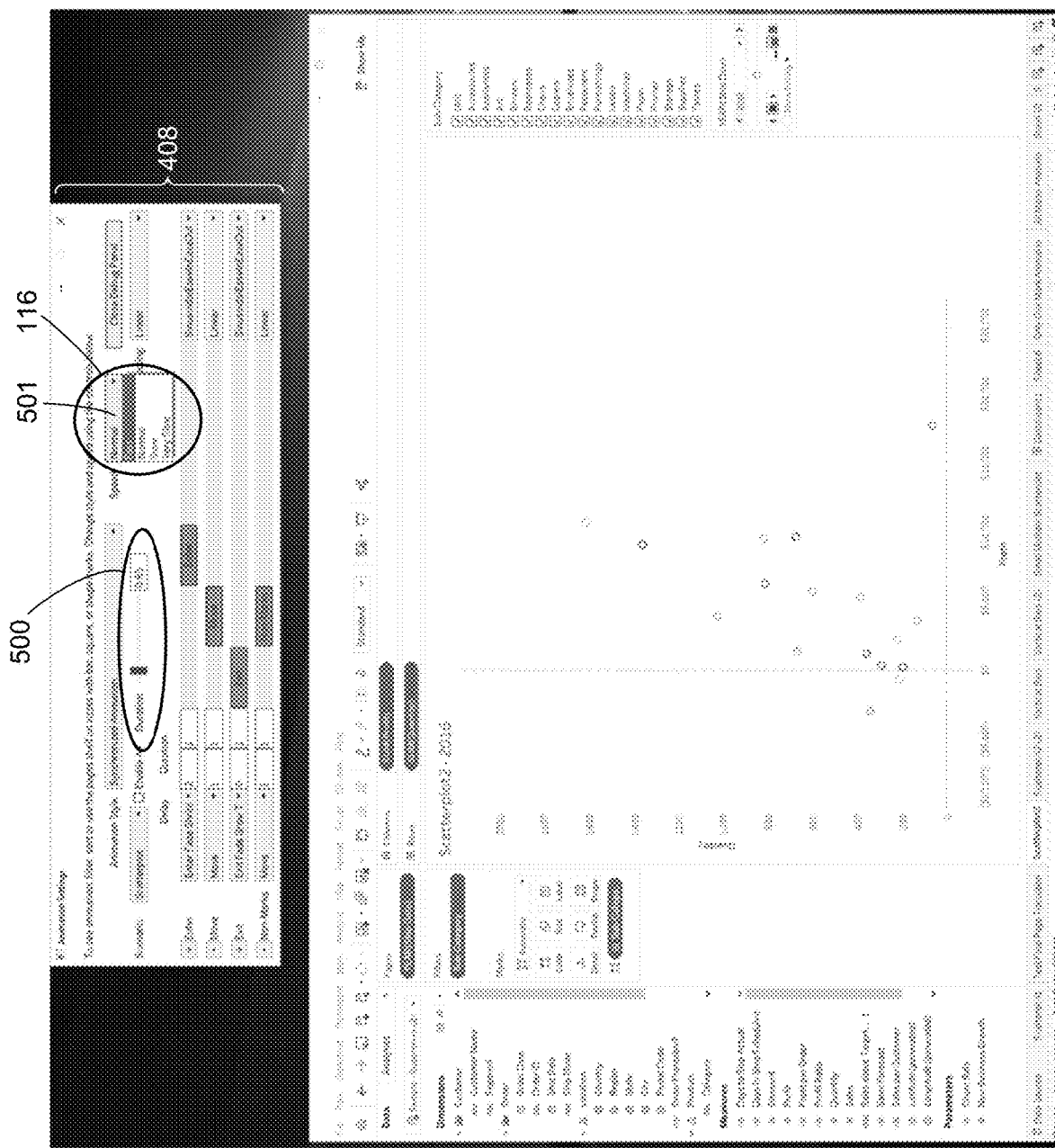
Figure 5C:
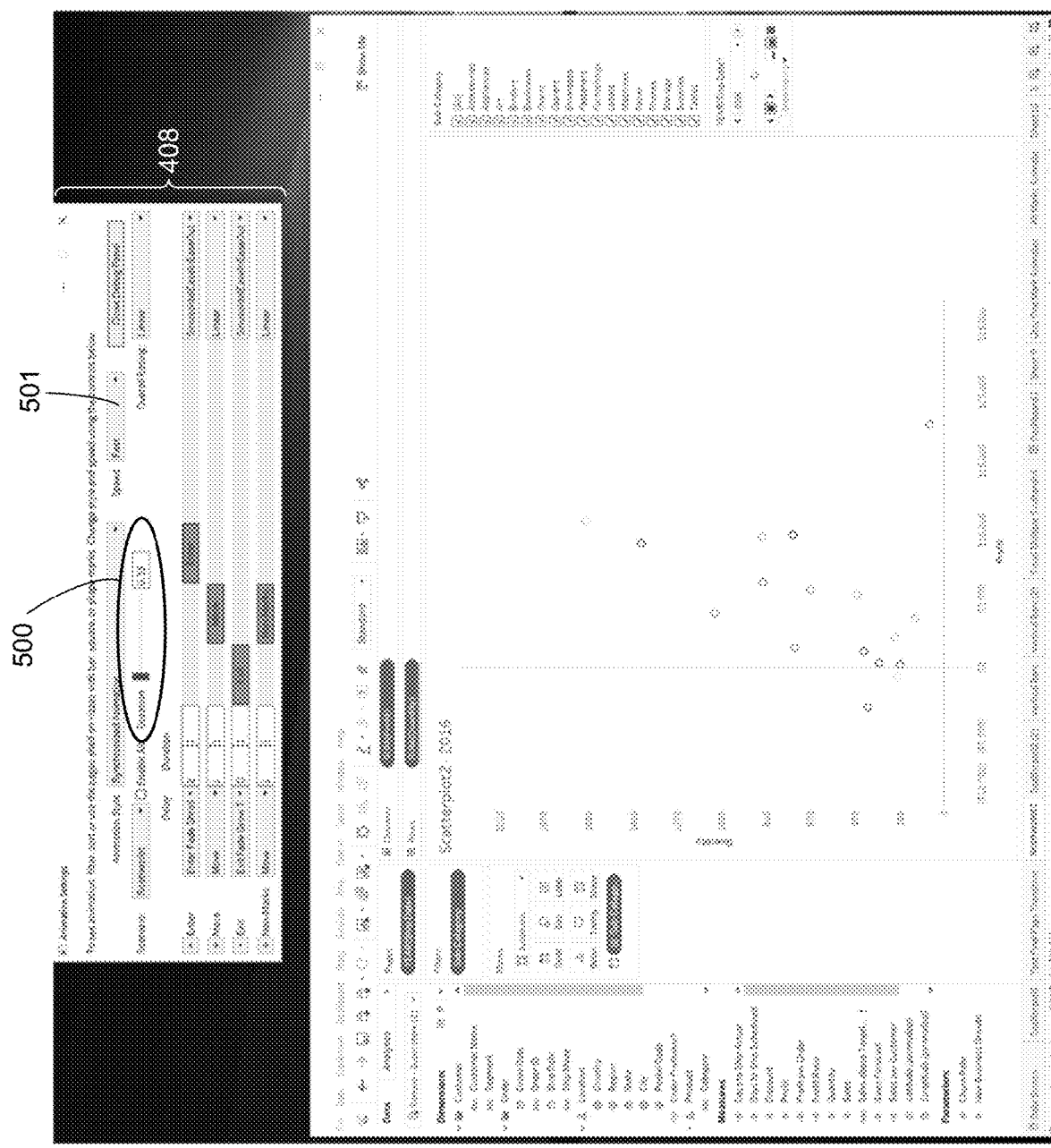
Figure 5D:
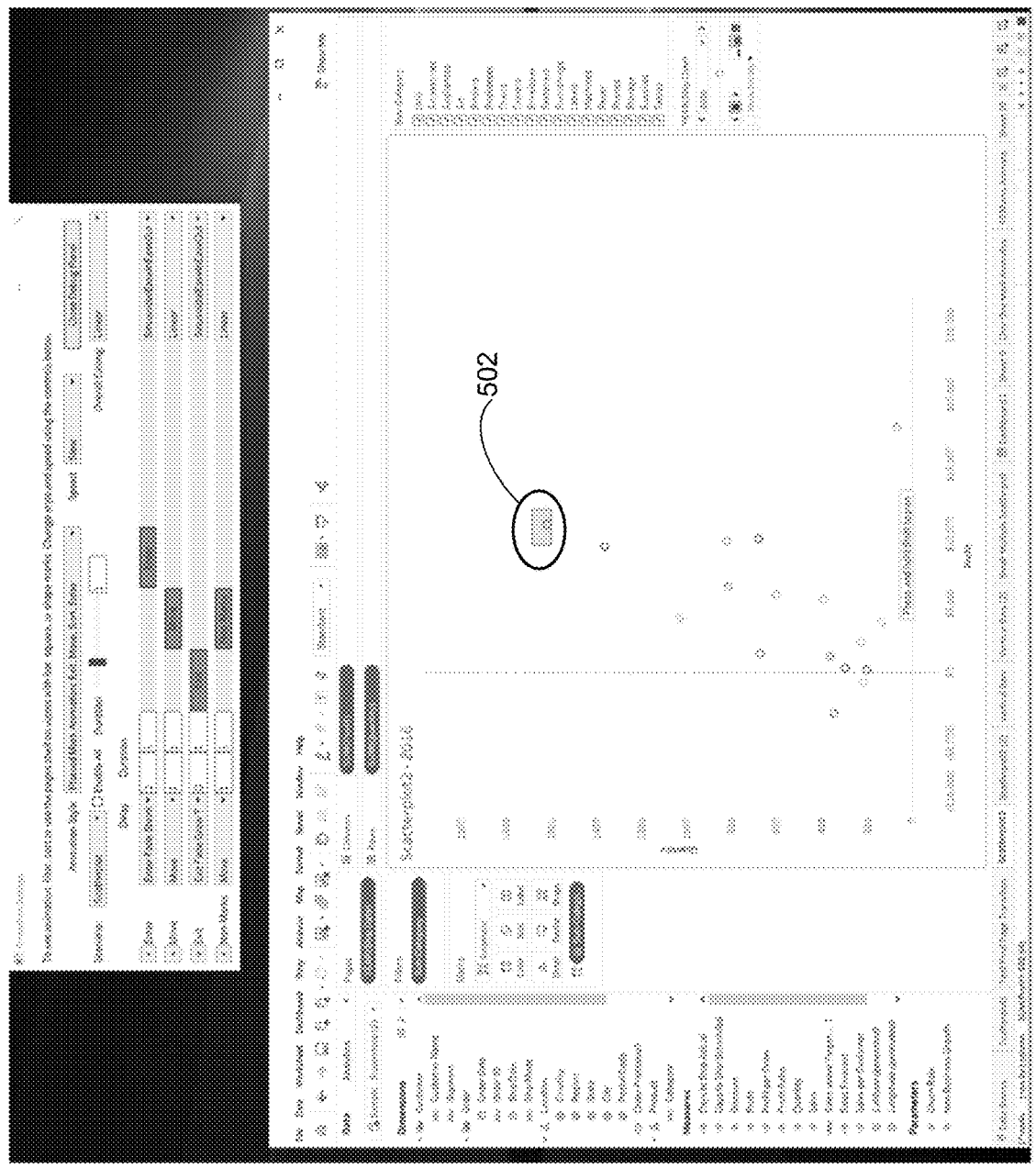
Figure 5E:
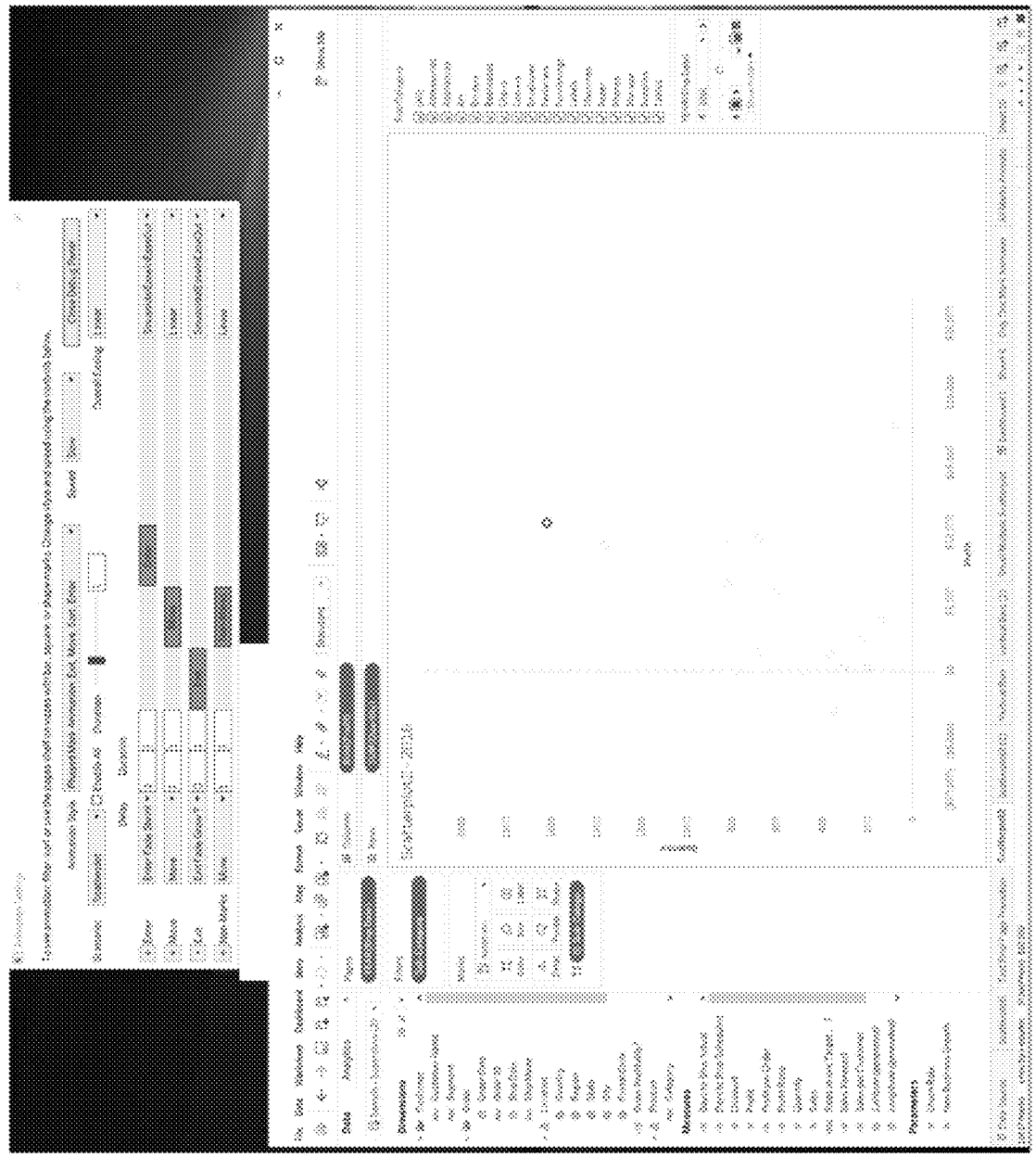
Figure 5F:
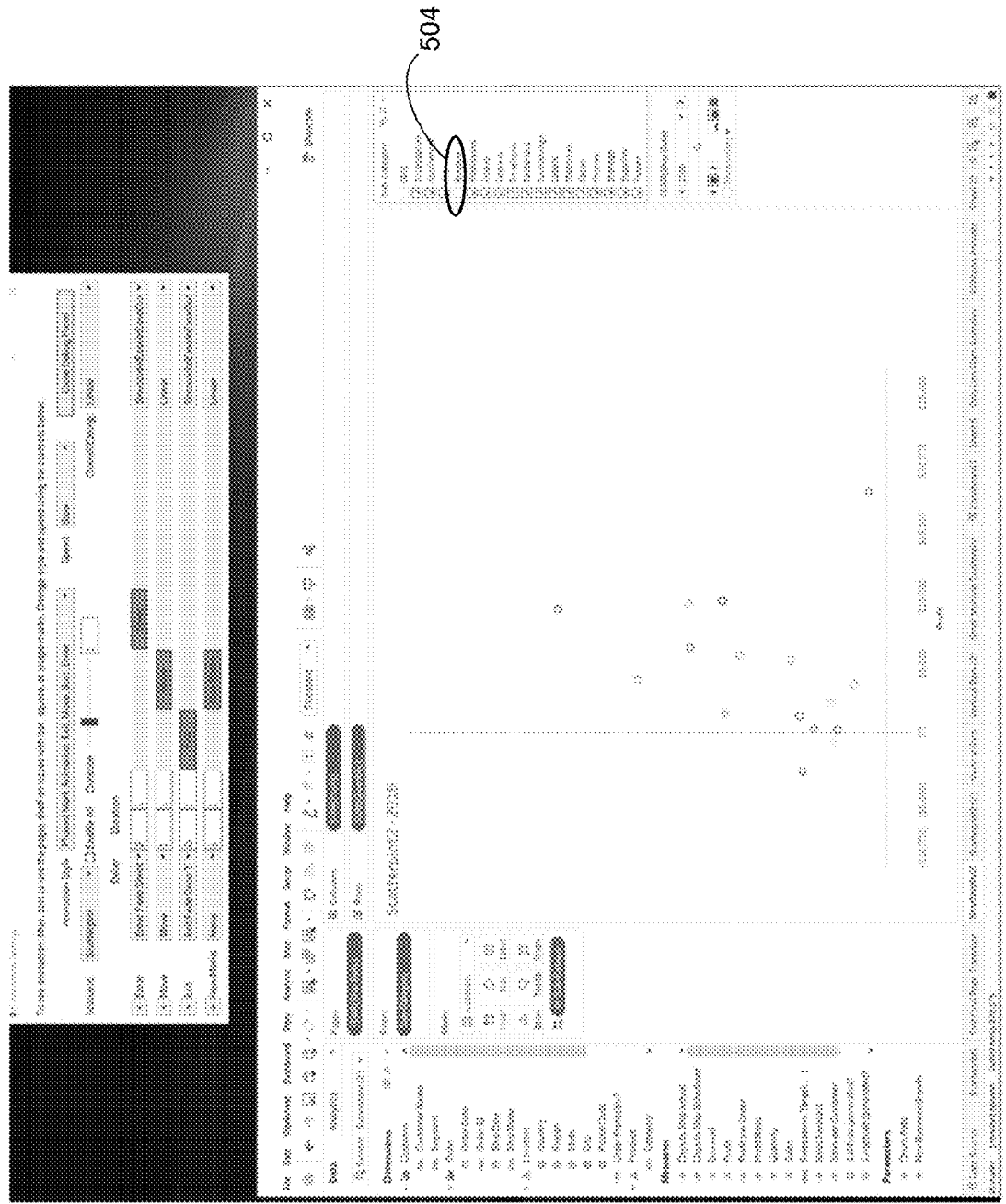
Figure 5G:
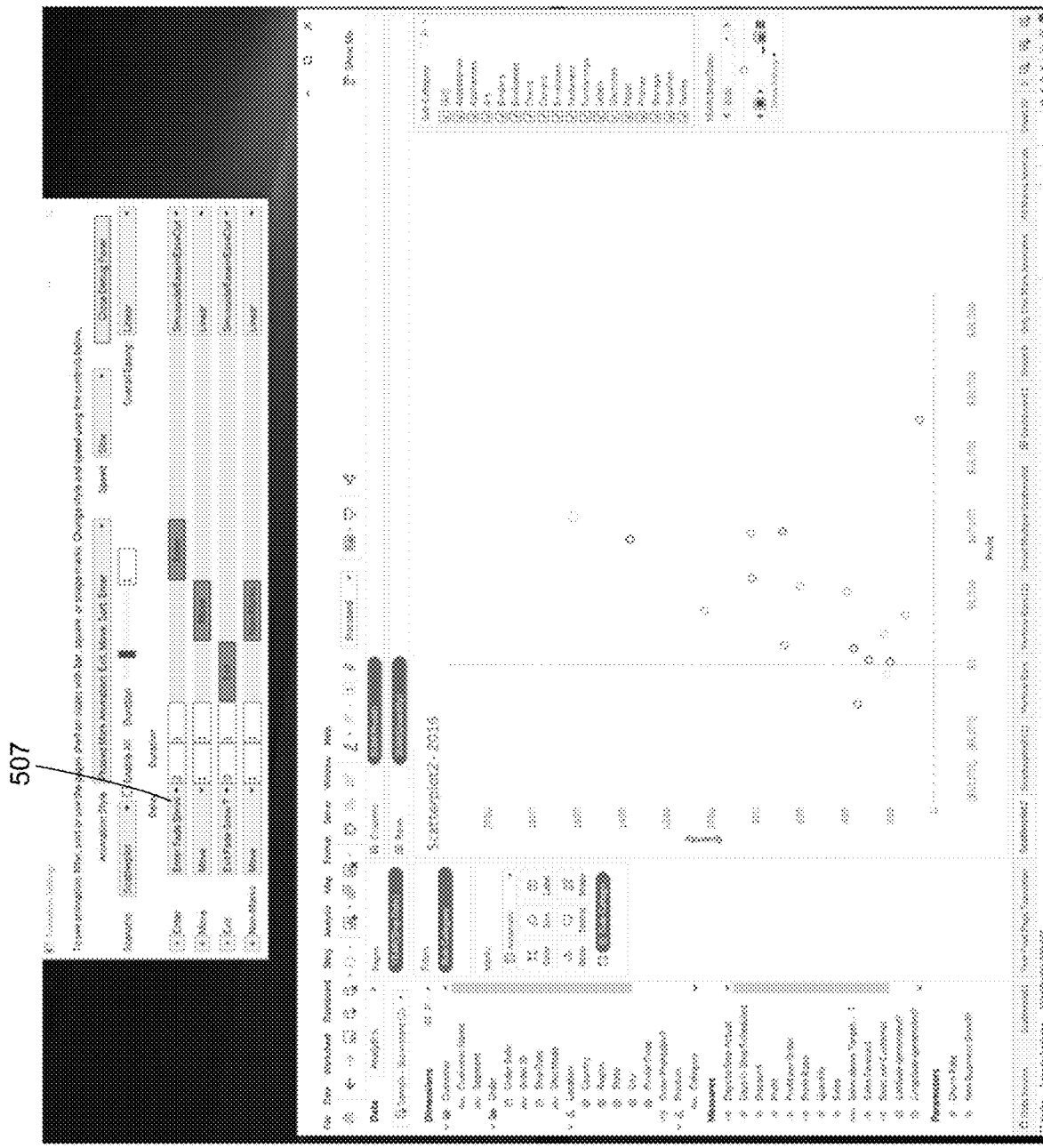
Figure 5H:
Figure 5I:
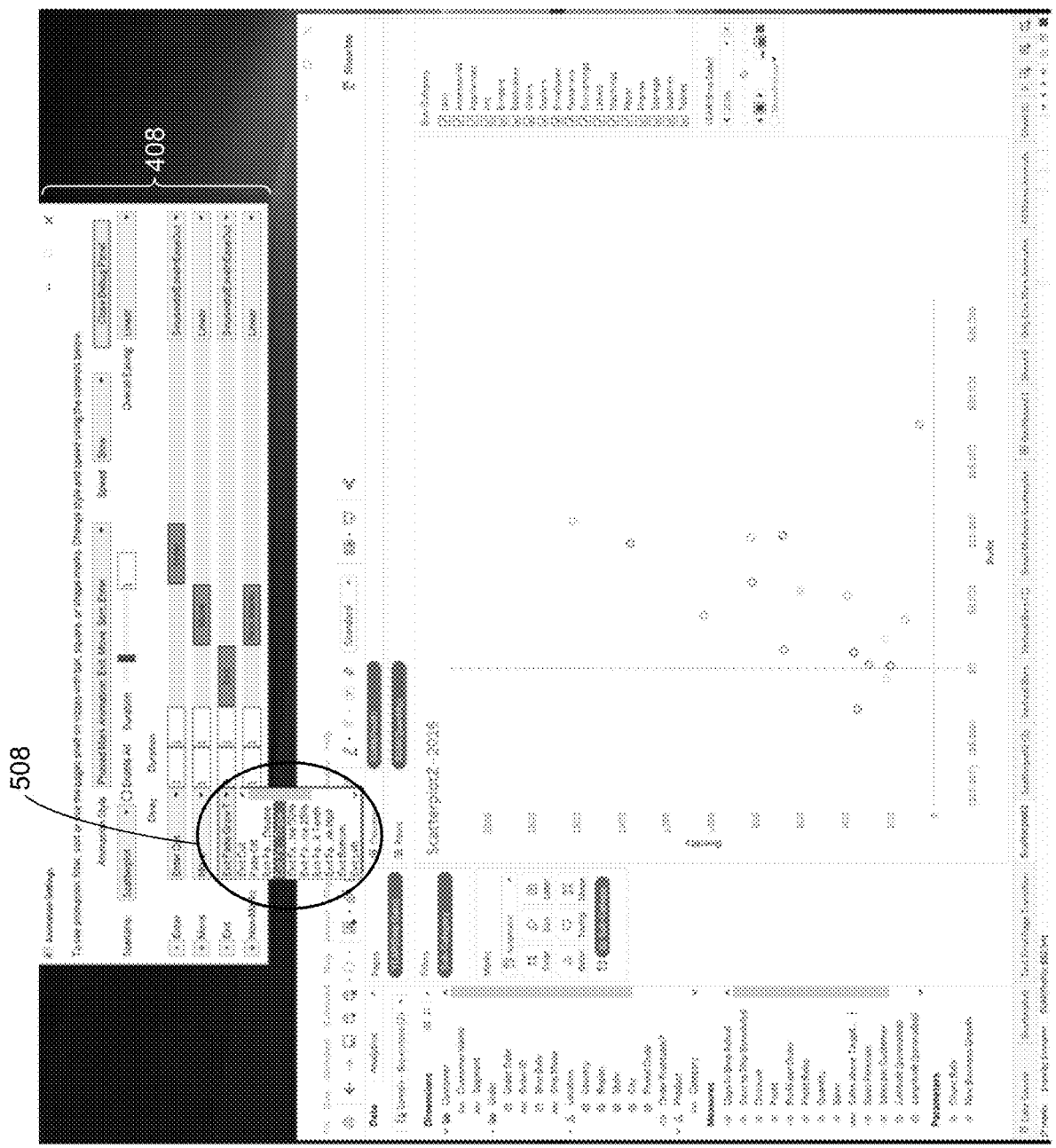
Figure 5J:
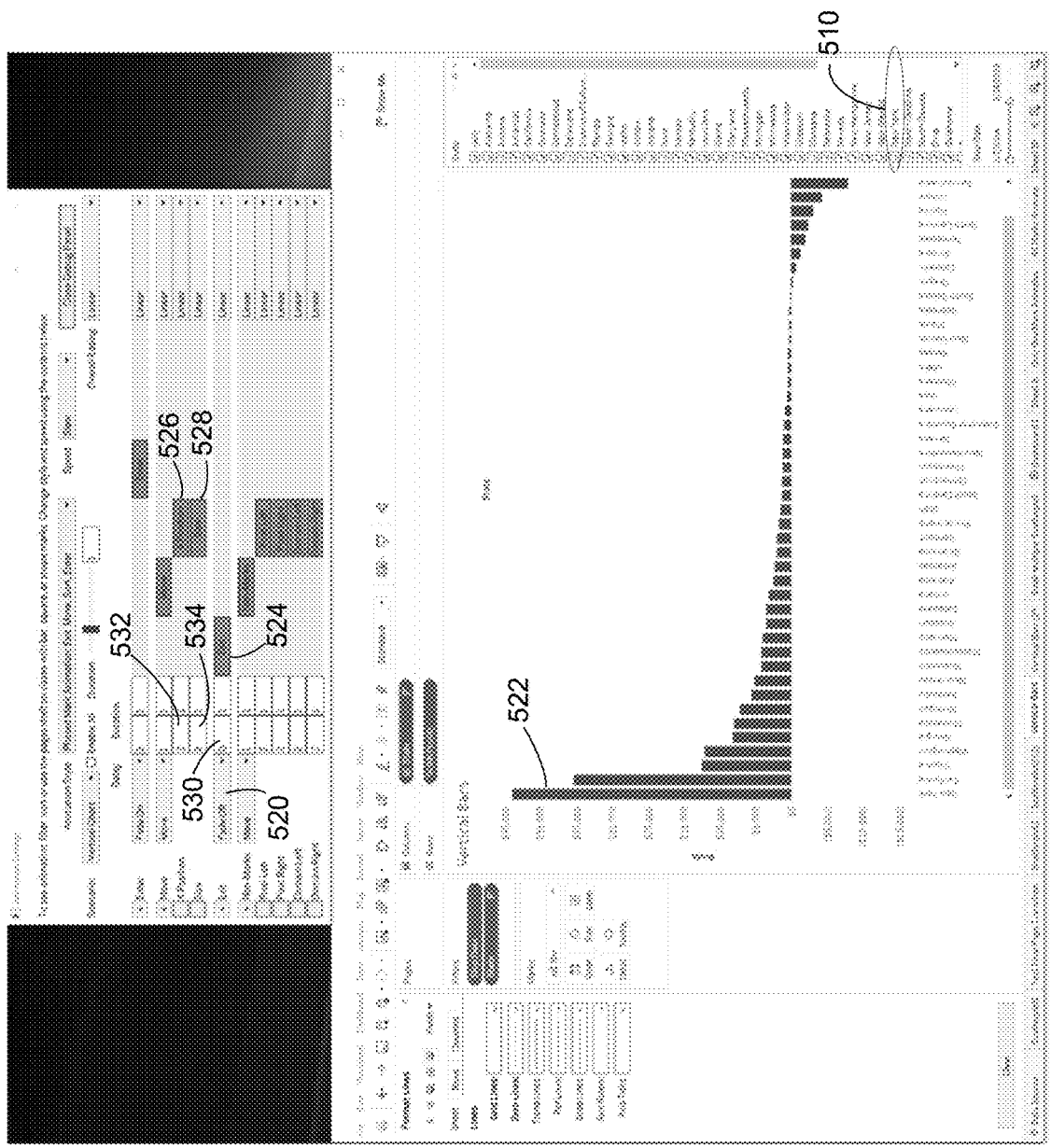
Figure 5K:
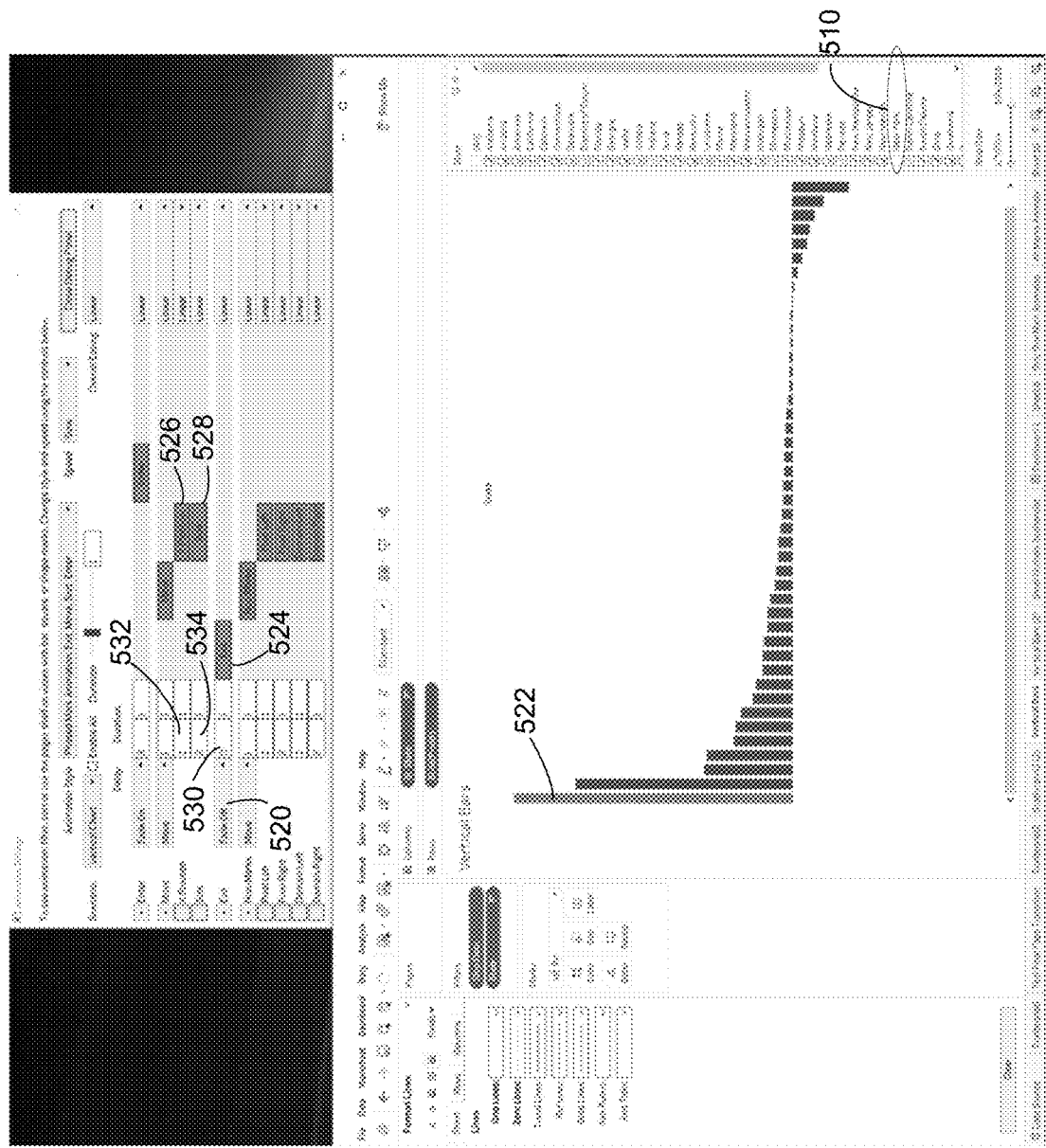
Figure 5L:
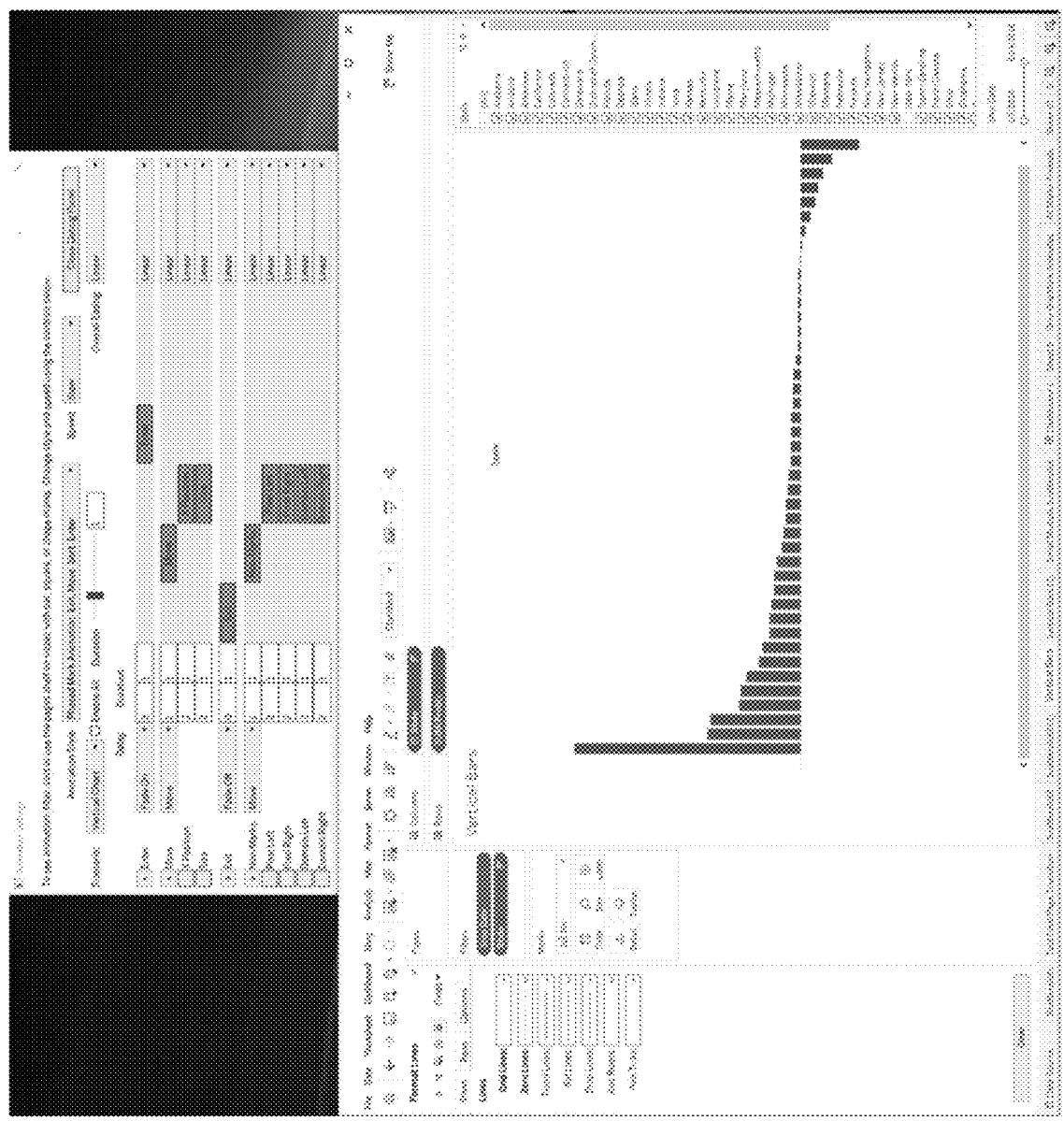
Figure 5M:
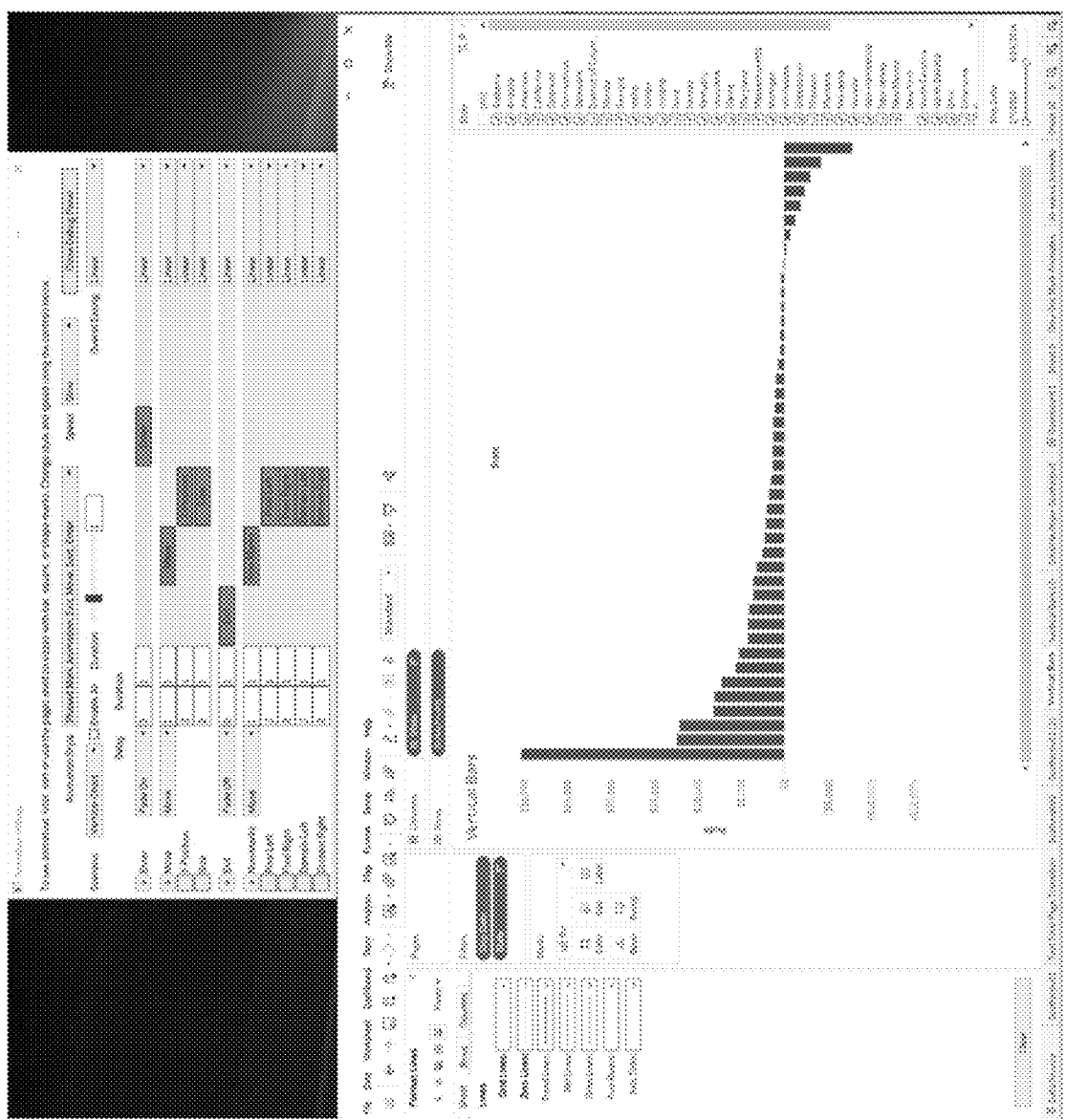
Figure 5N:
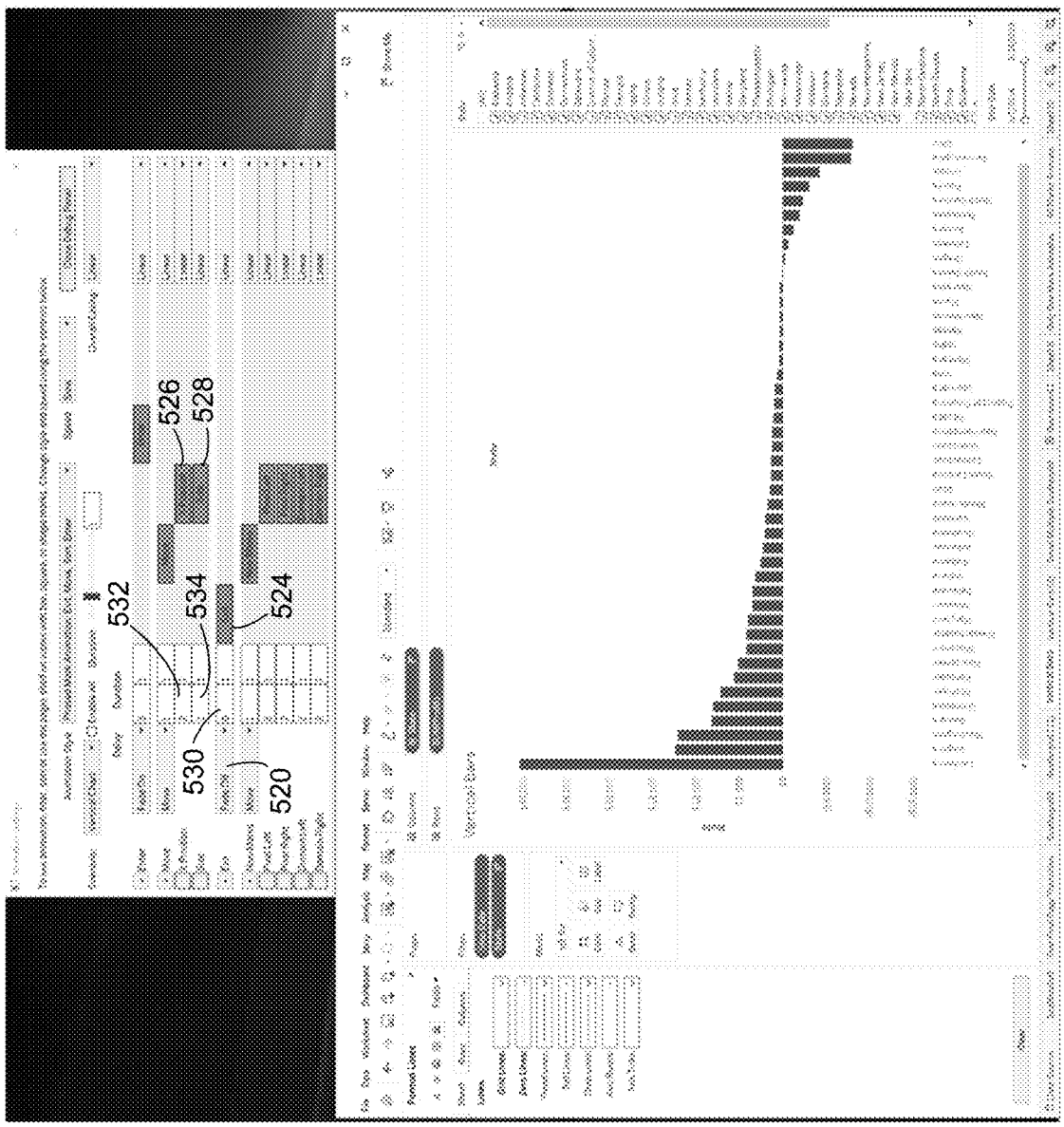

FIGS. 5A-5N illustrate animation settings that can be applied to animated transitions. In general, the settings are managed by developers of the data visualization application 222 and/or an application administrator. In some implementations, the settings can be changed in a debug window 408. In general, once optimal settings are determined for various types of data visualizations, those settings are applied automatically. Although the debug window 408 is shown adjacent to the data visualization user interface 100, the debug window may be displayed on a separate screen, and the debug window is generally not available to most users. The debug window is used here to demonstrate some of the animation parameters, but the animation parameters exist independently of the debug window. In particular, the same animation parameters and their appropriate settings are applied for users who have no access to the debug window at all.

The debug panel 408 provides an animation style dropdown 114 as shown in FIG. 5A. The animation style dropdown 114 includes selectable options, including "no animation," "synchronized animation" and "phased mark animation: exit, move, sort, enter," as described above with reference to FIG. 1. FIG. 5B illustrates the speed dropdown 116, which provides selectable options, including "Fast," "Normal," "Slow," and "Very Slow." The original option is Normal 501, which results in an animation duration of 0.65 seconds, as shown by the Duration parameter 500. In FIG. 5B, the "Fast" speed 501 has been selected for the animation, which appears in FIG. 5C. The Duration parameter 500 has been accordingly updated to 0.33 seconds. Instead of specifying the Speed parameter directly, a user with access to the debug window can specify the Duration parameter 500 using a slider.

FIG. 5D illustrates a user input 502 selecting (e.g., highlighting) a visual mark in the data visualization. The data visualization includes a plurality of other visual marks (e.g., circles). In response to the user input 502, the data visualization updates, in FIG. 5E to emphasize (e.g., bold) the selected visual mark. The other visual marks are removed from the data visualization in FIG. 5E, only showing the selected visual mark. Then, in FIG. 5F, the data visualization updates again, this time removing the emphasized selected visual mark, and spacing out vertically the plurality of other visual marks. FIG. 5F shows that "Binders" 504 is no longer selected in the filter area. Thus, the selected mark (e.g., which is now removed) corresponds to the "Binders" 504 sub-category. By allowing a user to select a mark and providing an animation of the transition, a user can easily identify how various filters and/or inputs affect the data visualization.

FIG. 5G illustrates a data visualization that includes all of the sub-categories represented as visual marks. The debug window 408 shows that the animation type 507 is "Enter Fade Shrink" for data marks that enter during the animation.

FIG. 5H illustrates that the animation type parameter 507 can be modified (e.g., using the dropdown 506). For example, the animation type parameter can specify the type of entrance an animation will use for new marks, such as Enter Cut, Fade On, Enter Bottom, Enter Left, Enter Fade Shrink, Enter Fade Shrink Double, Enter Fade Shrink Triple, Enter Fade Pulse, Enter Fade Pulse 50%, Enter Fade Pulse 25%, Enter Fade Pulse One Tenth, and Enter Fade From Half Some implementations provide addition animation types. Further, as shown in Figure SI, there is an animation type parameter 508 for exiting marks as well. "Exit" setting can similarly be modified (e.g., using dropdown 508) such that a user can select what type of exit an animation will use.

FIG. 5J illustrates a data visualization in a first state. The data visualization is a bar chart with a plurality of bar marks. Each bar corresponds to the Sum(Profit) for a particular state (e.g., New York or California). In response to a user input to modify a filter (e.g., by deselecting New York 510), an animation is triggered. As illustrated in FIGS. 5K-5M, the bar mark 522 that corresponded to "New York" on the leftmost side of the data visualization fades out (e.g., as defined in the debug panel by "Exit" set to "Fade off" 520) and at least some of the plurality of visual marks remain in the second state of the data visualization, illustrated in FIG. 5N. The remaining portion of the plurality of visual marks (e.g., which includes all of the visual marks from the first data visualization in FIG. 5J except for the removed visual mark corresponding to New York) shift left into the space that was previously taken by the visual mark corresponding to New York. As specified in the debug window here, an animation removes marks before moving the remaining marks. This is defined by both the animation sequence bars 524 and 526 as well as the delay parameter values 530 and 532. The delay=0 for exit, but the delay=2 for X position moves. The resizing of the bars occurs at the same time as the X position moves according to the delay parameter value 524 and the animation sequence bar 528.

FIG. 5N shows the resulting data visualization, where the visual mark corresponding to New York has been removed, also making space for Ohio to appear as the right most visual mark. Note that during the animated transition, the axis labels for the states and the axis labels for Profit were removed and updated for the resulting data visualization (e.g., in the second state).

Figure 6A:
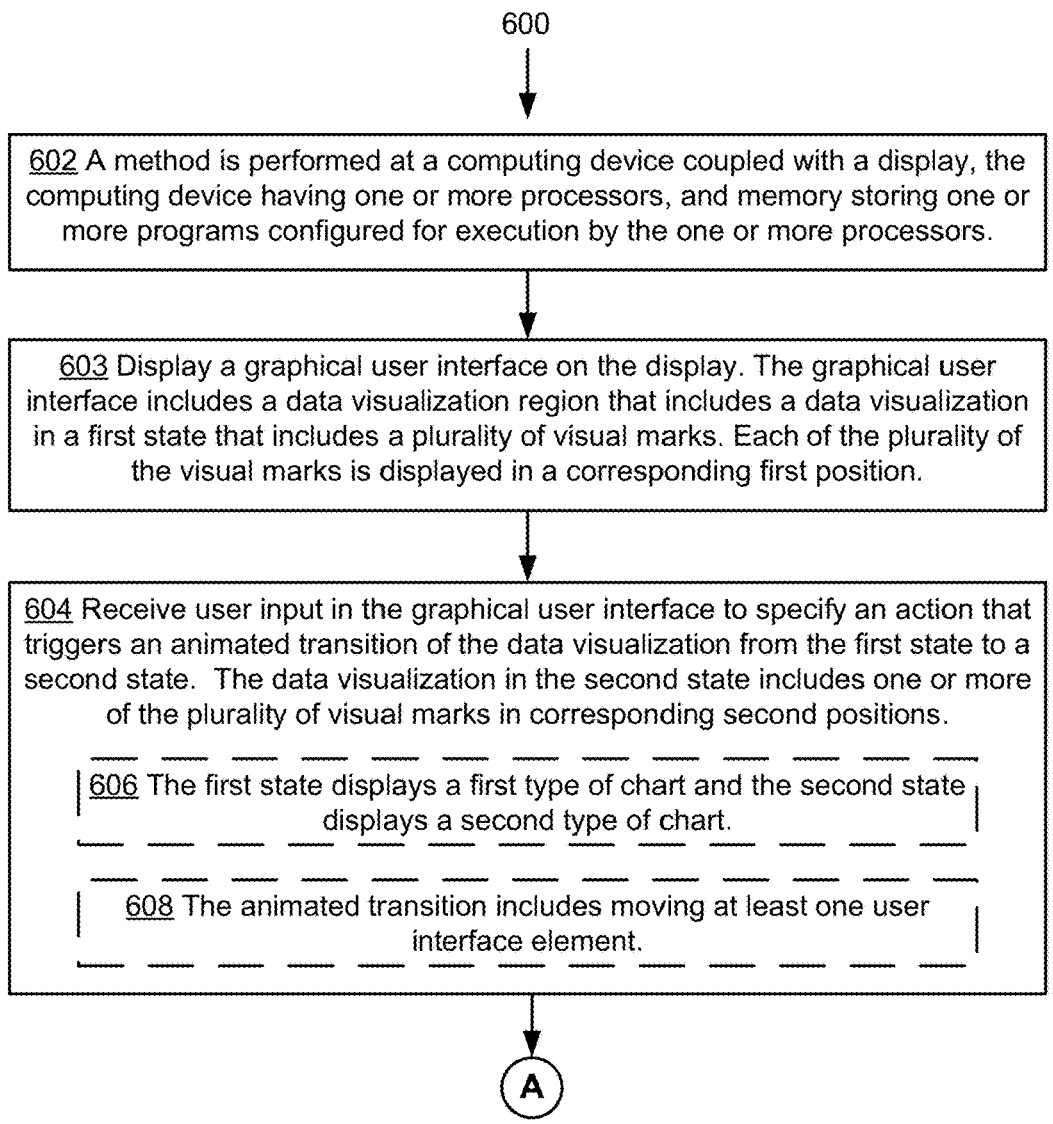

FIGS. 6A and 6B illustrate a method 600 of displaying a data visualization using an animated transition. The method 600 is also called a process. In some implementations, the method is executed at and performed (602) by a computing device coupled with a display, the computing device having one or more processors, and memory storing one or more programs configured for execution by the one or more processors. The method 600, as performed by a computing device, is optionally governed by instructions that are stored in a non-transitory computer-readable storage medium. The instructions are executed by one or more processors of the computing device. Each of the operations shown in FIGS. 6A and 6B may correspond to instructions stored in computer memory or a non-transitory computer-readable storage medium (e.g., the memory 214 of a computing device 200). The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 600 may be combined and/or the order of some operations may be changed.

In some implementations, the computing device displays (603) a graphical user interface on the display. For example, the computing device displays the graphical user interface 100 illustrated in FIG. 1. The graphical user interface includes a data visualization region that includes a data visualization in a first state that includes a plurality of visual marks. Each of the plurality of the visual marks is displayed in a corresponding first position.

The computing device receives (604) a user input in the graphical user interface to specify an action that triggers an animated transition of the data visualization from the first state to a second state. For example, the user input could correspond to a user applying a filter, a sort, or by selecting different pages/data (such as described above with reference to FIGS. 3C-3G). The data visualization in the second state includes one or more of the plurality of visual marks in corresponding second positions. For example, a portion of the visual marks included in the first data visualization is not included in the second visualization (e.g., a mark is removed). In some implementations, all of the visual marks from the first state are included in the second state of the data visualization. In some implementations, the first state displays (606) a first type of chart and the second state displays (606) a second type of chart (e.g., having a different view type). In some implementations, the animated transition moves (608) at least one user interface element (e.g., an element that is not one of the visual marks corresponding to a data point in the data source).

In response to the user input, the device triggers (610) the animated transition of the data visualization from the first state to the second state. The animated transition is configured by three or more visual parameters, including: an animation mode (e.g., an animation style), an animation speed, and an animation emphasis.

In some implementations, the animation mode is (612) one of: (i) a synchronized mode in which movements of one or more visual marks of the plurality of visual marks are displayed at the same pace; (ii) a phased mode in which: movements of a first group of visual marks of the plurality of visual marks are displayed in a first stage of a plurality of stages, movements of a second group of visual marks of the plurality of visual marks are displayed in a second stage of the plurality of stages, and the first group of visual marks is different from the second group of visual marks; and (iii) a cut mode in which the animated transition switches from the first state to the second state by directly displaying the one or more visual marks of the plurality of visual marks in the corresponding second position without displaying a movement trajectory of a visual mark of the one or more visual marks from the corresponding first position to the corresponding second position.

Figure 7A:
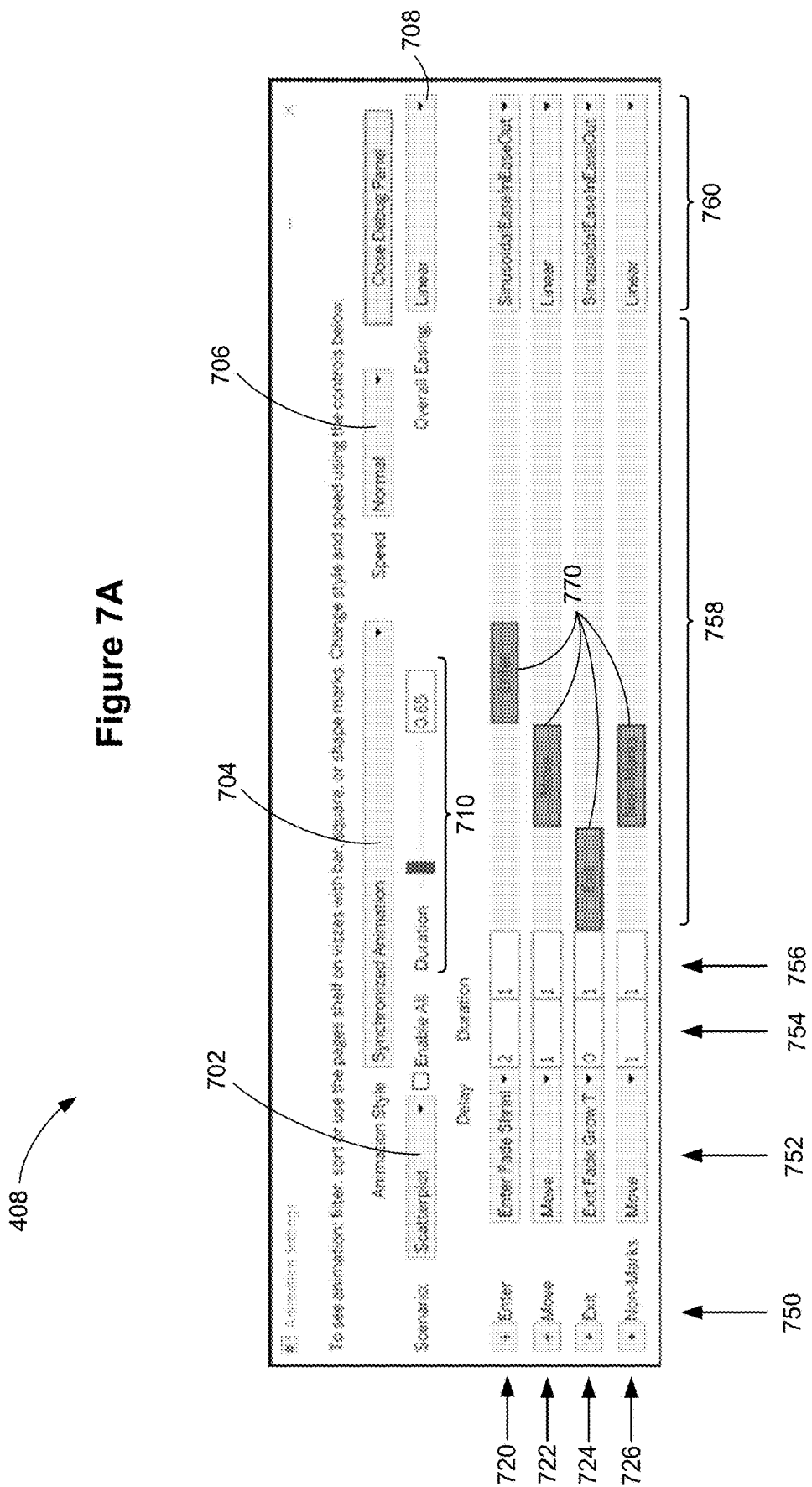
FIGS. 7A and 7B illustrate some of the animation parameters used to configure animations, in accordance with some implementations.
Figure 7B:
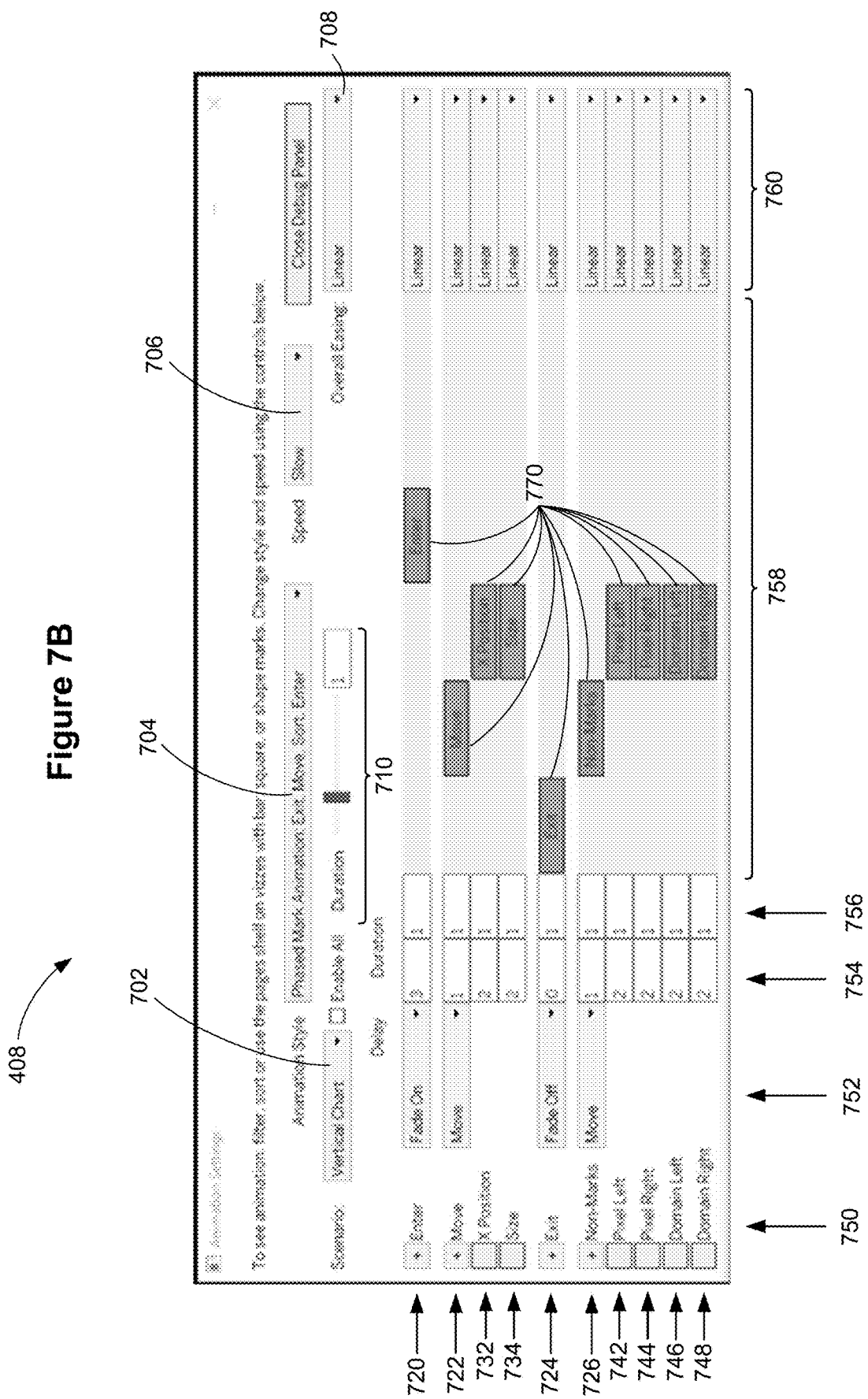

As illustrated in more detail below in FIGS. 7A and 7B, the phased mode can include more than two distinct groups of visual marks and each group of marks can have two or more animation phases. FIGS. 7A and 7B illustrate four distinct groups of marks (corresponding to rows 720, 722, 724, and 726) and for some data visualizations some groups have two or more animation steps. For example, for a Vertical Chart, the move row 722 has distinct actions for X-position movement (row 732) and resizing (row 734).

In some implementations, when the animated transition is configured in the synchronized mode or the phased mode, the animated transition moves (614) at least one visual mark of the one or more visual marks, including displaying on the display a trajectory of the at least one visual mark from the corresponding first position to the corresponding second position.

In some implementations, when the animated transition is configured in the synchronized mode or the phased mode, the device receives (616) user input in the graphical user interface to specify an action that triggers replaying of the animated transition. In response to the user input, the device replays (616) the animated transition and modifies the animated transition according to the animation emphasis.

In some implementations, the animation emphasis highlights (618) a region within the data visualization.

In some implementations, the animation speed specifies (620) the duration of the animated transition.

FIGS. 7A and 7B illustrate some of the animation parameters used for data visualization transitions. Some implementations provide a debug window 408 for developers or advanced users to optimize or customize the animation parameters for specific types of data visualizations and/or specific types of transitions.

The parameters displayed depend on the type of data visualization. Many of the animation parameters are shared across multiple data visualization types (also referred to as view types or chart types), but some of the parameters are unique. FIG. 7A shows the debug window for a Scatterplot, as indicated in the Scenario control 702. In general, each scenario corresponds to a single view type, but in some instances a single view type has variations that are treated as distinct scenarios.

The Animation Style control 704 determines the overall mode of the animation. As noted above, some implementations refer to three modes as "cut mode" (no animation), "synchronized mode" (all of the animation of data marks proceeds synchronously), and "phased mode" or "staged mode" to designate an animation that proceeds in two or more temporal stages.

The Speed control 706 and Duration control 710 are two alternative ways of controlling the same thing, which is how fast the animation will perform. The Speed control 706 is a simple control with a limited number of different speeds (e.g., slow, normal, and fast). If the Speed is selected, the duration is computed and displayed in the Duration control 710. Alternatively, a user can use the Duration control 710 to specify the duration parameter, which is typically specified as a decimal number of seconds. In some implementations, an approximate Speed parameter value is computed based on what is selected in the Duration control 710. In some implementations, a user can change the duration by either moving a slider or typing in a value.

Another animation parameter is the overall easing, which is specified using the Overall Easing control 708. When changing a displayed value from one value A to another value B, the intermediate values can be distributed over time according to a function of time f(t) from a starting value at t=0 to an ending value at t=1. Such a function is commonly called an easing function. If the values are distributed evenly (e.g., 0, 0.2, 0.4, 0.6, 0.8, 1.0), it is a linear function. If the values are clustered towards the beginning (e.g., 0, 0.05, 0.1, 0.2, 0.4, 0.7, 1.0), it is referred to as an "ease in." If values are clustered toward the end, it is referred to as an "ease out." There are an infinite number of such functions. Some implementations provide 20 commonly used easing functions, including Linear, SinusoidalEaseIn, SinusoidalEaseOut, SinusoidalEaseInEaseOut, BounceEaseOut. Some implementations provide more or fewer easing functions. In addition to the Overall Easing control, there are individual easing overrides that can be specified in the easing column 760 in the Debug window 408. The most common values for easing are "Linear" and "SinusoidalEaseInEaseOut".

During an animation, there are many objects in the user interface that can (i) "enter" during the animation (objects that were not previously displayed), (ii) exit during the animation (objects that were displayed, but are going away), and (iii) objects that move from one location to another during the animation. There can be many (e.g., hundreds or thousands) of objects that move during an animation, and they can all be tracked independently. For purposes of animation, it is useful to group the objects together based on how they will be animated. In some implementations there are four groupings. The behavior of all data marks that enter the data visualization during the animation is determined by the controls on the Enter row 720 in the debug window 408. The behavior of all data marks that neither enter nor exit (they generally move) is determined by the controls on the Move row 722 in the debug window 408. For all data marks that exit the data visualization during the animation, the behavior is specified by controls in the Exit row 724. These are typically the most important groups. There is a fourth group, which covers all other user interface objects that may move during the animation (e.g., axes, axis labels, shelves, or quick filters). The behavior of these elements is controlled by the Non-Marks row 726 in the debug window 408.

The first column 750 specifies one of the four groups just described. In some implementations, more granular grouping is provided when needed. The animation type column 752 enables a user to specify how the animated transition occurs for each of the object groupings. Note that the possible animation types depend on the object grouping. For example, fading is a possible option for marks that are entering or exiting, but fading is generally not allowed for the marks in the Move group 722. For enter, the animation type fadeOn fades the mark in place. The animation types enterLeft, enterRight, enterTop, and enterBottom move marks into place from a location offscreen to the left/right/top/bottom respectively. The animation types enterFadeLeft, enterFadeRight, enterFadeTop, and enterFadeBottom fade the mark on while moving it into place. The animation type enterImplode fades on while simultaneously scaling down from a larger size, which may be any scale larger than the ending scale. The animation type enterPulse fades on while simultaneously scaling up and then down from the desired scale, to a larger one, and back to the desired scale. For Move, there is only a DirectMove transition from the start parameters to the end parameters. For exit, the animation type fadeOff fades the mark off in place. The animation types exitLeft, exitRight, exitTop, and exitBottom move marks out of place from the starting location to an offscreen to the left/right/top/bottom respectively. The animation types exitFadeLeft, exitFadeRight, exitFadeTop, and exitFadeBottom fade the mark off while moving it offscreen. The animation type exitExplode fades off while simultaneously scaling up to a larger size, which may be any scale larger than the starting scale. The animation type exitPulse fades off while simultaneously scaling up from the starting scale, to a larger one, and then back to the starting scale. For non-marks, some implementations provide only the Direct-Move animation type from start to end.

Some implementations include a delay parameter, which is specified in the delay column 754. In some implementations, the delays are specified as non-negative numbers for each of the object groups. The numbers specify the delay as a multiplier that can be applied to the overall duration. Therefore, the delay multiplier is typically independent of the overall duration. For example, if the overall duration is 0.65 seconds as specified in the example of FIG. 7, and a given stage has a delay of two units of time, then that stage will have a starting time of 2*0.65 seconds after the beginning of the animation. If the starting time (delay*overall duration) of one stage is less than the ending time of another stage, then those two stages will overlap temporally. If the starting time (delay*overall duration) of one stage is equal to the ending time of another stage, then those two stages will be played end-to-end. If the starting time (delay*overall duration) of one stage is greater than then ending time of another stage, then in some implementations, there will be a pause between the two stages, and in other implementations, the pause will automatically be removed to play the stages end to end.

Some implementations also include a Duration column 756, which specifies the time duration for animating each of the object groups. Note the difference between this duration, which can be different for each stage and the overall duration specified by the Duration control 710. The duration specified by the duration control is used in calculating starting and ending times in combination with both the individual delays for each stage and the individual durations for each stage. The Duration control 710 specifies the total duration of the animation in a decimal number of seconds, whereas the duration column 756 specifies the duration of animating individual object groups, and the durations are typically expressed as a multiplier applied to the overall duration. Typically, each of the object groups has a duration of 1, and these object group durations remain 1 even if the total duration of the animation changes. Some implementations allow the durations to be changed. For example, if the duration of a given stage is 0.65 and the overall duration for the animation is 2.0 seconds, then the final duration of the animation of that stage will be 0.65*2.0 seconds. Therefore, the ending time of the animation will be 2.0*0.65 seconds after the starting time.

The delays and durations for each object group are also displayed visually by the animation sequence bars 770 in the animation sequence column 758. In this interface, a user can slide the animation sequence bars horizontally to change the order. In some implementations, the animation sequence bars can be resized as well (e.g., by selecting a horizontal endpoint of a bar and expanding). Moving or resizing animation sequence bars updates the corresponding values in the delay column 754 and the duration column 756. Conversely, updating the delay or duration values in the delay column 754 or duration column 756 causes appropriate horizontal movement and/or resizing of animation sequence bars in the animation sequence column 758. If each of the animation sequence bars 770 has a distinct horizontal location, the animation stages flow sequentially in that order. On the other hand, if all of the animation sequence bars 770 are moved all the way to the left, then all of the animation for all of the object groups occurs at the same time, which would be equivalent to selecting "Synchronized Animation" in the Animation Style control 704.

The easing column 760 allows a user to override the overall easing specified in the Easing control 708.

FIG. 7B is similar to FIG. 7A, but has some additional parameters that are appropriate for a vertical chart, as specified in the Scenario control 702. For a vertical chart, some of the animation groups have two or more independent animation features, and the sequencing of the features can be controlled independently. For moving data marks (in the object group "Move"), the bars in the bar chart can be moved horizontally as specified in the X Position row 732, and the bars can be resized as specified in the Size row 734. In some instances, it is useful to update these two characteristics separately, as illustrated above in FIGS. 5J-5N (after a bar is removed, the remaining bars move left, and then the bars are resized).

For a vertical bar chart, there are also four characteristics that can be animated separately for the object group 726 of "Non-Marks". In this case, the characteristics are specified in the Pixel Left row 742, the Pixel Right row 744, the Domain Left row 746, and the Domain Right row 748. The Pixel left/right/parameters describe the locations in screen space of the vertical edges of the chart being displayed. For example, if the starting PixelLeft is 0 and the ending PixelLeft is 100, then the left edge of the chart will move from left to right, from pixel 0 to pixel 100. The Domain left/right parameters describe the maximum/minimum measure values that will be displayed within those pixel boundaries. For example, if the domainLeft begins as 100 and ends as 200, then a mark located at an X measure value of 150 will be included at the beginning of the transition, since it is to the right of the minimum value of 100, but it will not be included at the end of the transition, since the leftmost value included in the chart will be 200, which is greater than the mark's measure value of 150. Such a mark will appear to move leftward out of the chart as the animation proceeds.

The remaining animation parameters specified in the debug window in FIG. 7B have the same functionality as the corresponding animation parameters shown in FIG. 7A.

Other Scenarios specified in the Scenario control 702 include additional and/or different parameters. For example, a horizontal bar chart include a row for specifying the animation characteristics for Y Position, as shown in FIG.

4H above. In addition, for a Text Table or Horizontal Bar Chart, there are additional rows to specify animation characteristics for Pixel Bottom, Pixel Top, Domain Bottom, and Domain Right.

For each of the stages of a phased animation further customization may be provided based on the style/emphasis parameter. For example, for marks that are entering the data visualization, the style of the entering can be customized, such as having marks enter from the bottom or the top of the data visualization. Another example is marks that are exiting the data visualization. The existing marks exit to the left, to the right, to the top, to the bottom, or just fade away. An important aspect of animation is that the positions of data marks should be consistent with the actual data. Thus, moving marks along the x-axis and y-axis is generally avoided. For example, ripple effects are generally not used.

Although animation is typically applied within a single data visualization, some implementations apply the techniques more generally. At a high level, animations fall within four general groups, and animations can be applied to each of these:

in-viz animation, which is within a single data visualization.

zone animation, which moves around multiple data visualizations on a dashboard.

UI animation, which moves around other interface elements, such as the shelves, a legend, a quick filter box, or axis/heading labels.

chart-to-chart transitions, such as a transition from a bar chart to a line graph.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of animating data visualization, the method comprising:
   at a computing device having a display, one or more processors, and memory storing one or more programs configured for execution by the one or more processors:
   displaying a graphical user interface on the display, wherein the graphical user interface includes a data visualization region that includes a data visualization in a first state, the data visualization in the first state includes a plurality of visual marks, each of the plurality of visual marks represents a respective data value of a numerical data field, and each of the plurality of visual marks is displayed in a respective first position corresponding to the respective data value;
   receiving user input in the graphical user interface to specify an action that triggers a continuous animated transition of the data visualization from the first state to a second state, the user input selecting a subset of the visual marks for emphasis, wherein the data visualization in the second state includes one or more of the plurality of visual marks, each continuing to represent the respective data value of the numerical data field, displayed in a respective second position distinct from the respective first position; and
   in response to the user input, triggering the continuous animated transition of the data visualization from the first state to the second state, wherein the continuous animated transition is configured by three or more visual parameters, including: an animation mode, an animation speed, and an animation emphasis that highlights a designated region, within the data visualization, to identify continuous changes to the subset of the visual marks over a predefined duration of time during the continuous animated transition before displaying the data visualization in the second state.

2. The method of claim 1, wherein the animation mode is selected from a group consisting of:
   a synchronized mode in which movements of one or more visual marks of the plurality of visual marks are displayed at the same pace; and
   a phased mode in which:
   movements of a first group of visual marks of the plurality of visual marks are displayed in a first stage of a plurality of stages;
   movements of a second group of visual marks of the plurality of visual marks are displayed in a second stage of the plurality of stages; and
   the first group of visual marks is different from the second group of visual marks.

3. The method of claim 2, wherein when the animated transition is configured in the synchronized mode or the phased mode, the animated transition includes:
   moving at least one visual mark of the one or more visual marks, including displaying on the display a trajectory of the at least one visual mark from the respective first position representing the respective data value of the numerical data field to the respective second position representing the respective data value of the numerical data field.

4. The method of claim 2, further comprising when the animated transition is configured in the synchronized mode or the phased mode:
   receiving user input in the graphical user interface to specify an action that triggers a replaying of the animated transition; and
   in response to the user input, replaying the animated transition and modifying the animated transition according to the animation emphasis.

5. The method of claim 1, wherein the animation speed specifies the duration of the animated transition.

6. The method of claim 1, wherein the first state is a first type of chart and the second state is a second type of chart.

7. The method of claim 1, wherein the animated transition moves at least one user interface element.

8. A computing device, coupled with a display, comprising:

one or more processors;
memory storing one or more programs configured for execution by the one or more processors, the one or more programs including instructions for:
displaying a graphical user interface on the display, wherein the graphical user interface includes a data visualization region that includes a data visualization in a first state, the data visualization in the first state includes a plurality of visual marks, and each of the plurality of visual marks is displayed in a corresponding first position;
receiving user input in the graphical user interface to specify an action that triggers a continuous animated transition of the data visualization from the first state to a second state, the user input selecting a subset of the visual marks for emphasis, wherein the data visualization in the second state includes one or more of the plurality of visual marks, each continuing to represent the respective data value of the numerical data field, displayed in a respective second position distinct from the respective first position; and
in response to the user input, triggering the continuous animated transition of the data visualization from the first state to the second state, wherein the continuous animated transition is configured by three or more visual parameters, including: an animation mode, an animation speed, and an animation emphasis that highlights a designated region, within the data visualization, to identify continuous changes to the subset of the visual marks over a predefined duration of time during the continuous animated transition before displaying the data visualization in the second state.

9. The computing device of claim 8, wherein:
the synchronized mode displays movements of one or more visual marks of the plurality of visual marks at the same pace;
the phased mode displays (i) movements of a first group of visual marks of the plurality of visual marks in a first stage of a plurality of stages, and displays (ii) movements of a second group of visual marks of the plurality of visual marks in a second stage of the plurality of stages, wherein the first group of visual marks is different from the second group of visual marks; and
the cut mode switches the animated transition from the first state to the second state by directly displaying the one or more visual marks of the plurality of visual marks in the corresponding second position without displaying a movement trajectory of a visual mark of the one or more visual marks from the corresponding first position to the corresponding second position.

10. The computing device of claim 9, wherein when the animated transition is configured in the synchronized mode or the phased mode, the animated transition includes:
moving at least one visual mark of the one or more visual marks, including displaying on the display a trajectory of the at least one visual mark from the corresponding first position representing a respective data value of a numerical data field to the corresponding second distinct position representing the respective data value of the numerical data field.

11. The computing device of claim 9, wherein the one or more programs further comprise instructions that execute when the animated transition is configured in the synchronized mode or the phased mode, the further instructions for:

receiving user input in the graphical user interface to specify an action that triggers a replaying of the animated transition; and
in response to the user input, replaying the animated transition and modifying the animated transition according to the animation emphasis.

12. The computing device of claim 8, wherein the animation emphasis highlights a designated region within the data visualization.

13. The computing device of claim 8, wherein the animation speed specifies the duration of the animated transition.

14. The computing device of claim 8, wherein the first state is a first type of chart and the second state is a second type of chart.

15. The computing device of claim 8, wherein the animated transition moves at least one user interface element.

16. The computing device of claim 8, wherein the data visualization in the first state includes a plurality of visual marks, each of the plurality of visual marks represents a respective data value of a numerical data field, and each of the plurality of visual marks is displayed in a respective first position corresponding to the respective data value, and wherein the data visualization in the second state includes one or more of the plurality of visual marks, each continuing to represent the respective data value of the numerical data field, displayed in a respective second position distinct from the respective first position.

17. The computing device of claim 8, wherein the animation emphasis comprises:
increasing size of the visual marks in the subset, relative to the visual marks not in the subset; and
after increasing the size of the visual marks in the subset, decreasing the size of the visual marks in the subset.

18. A non-transitory computer-readable storage medium storing one or more programs configured for execution by the one or more processors, the one or more programs including instructions for:
displaying a graphical user interface on the display, wherein the graphical user interface includes a data visualization region that includes a data visualization in a first state, the data visualization in the first state includes a plurality of visual marks, each of the plurality of visual marks represents a respective data value of a numerical data field, and each of the plurality of visual marks is displayed in a respective first position corresponding to the respective data value;
receiving user input in the graphical user interface to specify an action that triggers a continuous animated transition of the data visualization from the first state to a second state, the user input selecting a subset of the visual marks for emphasis, wherein the data visualization in the second state includes one or more of the plurality of visual marks, each continuing to represent the respective data value of the numerical data field, displayed in a respective second position distinct from the respective first position; and
in response to the user input, triggering the continuous animated transition of the data visualization from the first state to the second state, wherein the continuous animated transition is configured by three or more visual parameters, including: an animation mode, an animation speed, and an animation emphasis that highlights a designated region, within the data visualization, to identify continuous changes to the subset of the visual marks over a predefined duration of time during the continuous animated transition before displaying the data visualization in the second state.

19. The computer-readable storage medium of claim 18, wherein the animation mode is selected from a group consisting of:
   a synchronized mode in which movements of one or more visual marks of the plurality of visual marks are displayed at the same pace; and
   a phased mode in which:
      movements of a first group of visual marks of the plurality of visual marks are displayed in a first stage of a plurality of stages;
      movements of a second group of visual marks of the plurality of visual marks are displayed in a second stage of the plurality of stages; and
      the first group of visual marks is different from the second group of visual marks.

20. The computer-readable storage medium of claim 19, further comprising when the animated transition is configured in the synchronized mode or the phased mode:
   receiving user input in the graphical user interface to specify an action that triggers a replaying of the animated transition; and
   in response to the user input, replaying the animated transition and modifying the animated transition according to the animation emphasis.

* * * * *